US009613106B2

(12) United States Patent
Pr et al.

(10) Patent No.: US 9,613,106 B2
(45) Date of Patent: Apr. 4, 2017

(54) VISUALIZING HIGH CARDINALITY CATEGORICAL DATA

(71) Applicant: SAS Institute Inc., Cary, NC (US)

(72) Inventors: Krishnan Pr, Maharashtra (IN); Prasad Pawar, Maharashtra (IN)

(73) Assignee: SAS INSTITUTE INC., Cary, NC (US)

(*) Notice: Subject to any disclaimer, the term of this patent is extended or adjusted under 35 U.S.C. 154(b) by 351 days.

(21) Appl. No.: 14/260,684

(22) Filed: Apr. 24, 2014

(65) Prior Publication Data
US 2014/0324738 A1    Oct. 30, 2014

(51) Int. Cl.
*G06F 15/18* (2006.01)
*G06F 17/30* (2006.01)

(52) U.S. Cl.
CPC ............... *G06F 17/30554* (2013.01)

(58) Field of Classification Search
CPC .................................................. G06F 17/275
USPC .................................................. 706/12, 45
See application file for complete search history.

(56) References Cited

PUBLICATIONS

Rosario et al., "Mapping Nominal Values to Numbers for Effective Visualization", Information Visualization, 2003. INFOVIS 2003. IEEE Symposium, Oct. 21, 2003, 12 pages.
Moustafa et al., "On Some Generalizations of Parallel Coordinate Plots", Seeing a Million, A Data Visualization Workshop. 2002, 18 pages.
Kosara, et al., "Parallel Sets: Interactive Exploration and Visual Analysis of Categorical Data", Transactions on Visualization and Computer Graphics, vol. 12, No. 4, Jul./Aug. 2006, 12 pages.

*Primary Examiner* — David Vincent

(57) ABSTRACT

A computer-program causing a computing device to perform an association measurement between a target variable and each non-target variable of a data set; select non-target variables for inclusion in a visualization based on the degree of association; perform correspondence analysis between target values of the target variable and non-target values of each selected non-target variable; order target value markers within a target row based on the degrees of closeness; order non-target value markers within each non-target row based on the degrees of closeness; determine a width of each target value marker based on a frequency of occurrence of its target value in the data set; determine a width of each non-target value marker based on a frequency of occurrence of its non-target value in the data set; and cause generation of the visualization with connection markers emanating from the target value markers and extending among the non-target value markers.

41 Claims, 17 Drawing Sheets

VISUALIZING HIGH CARDINALITY CATEGORICAL DATA

CROSS-REFERENCE TO RELATED APPLICATIONS

This application claims the benefit of priority under 35 U.S.C. §119(a-d) to Indian Patent Application No. 1828/CHE/2013 (provisional) entitled "VISUALIZING HIGH CARDINALITY CATEGORICAL DATA," filed Apr. 25, 2013, the entirety of which is incorporated herein by reference.

This application claims the benefit of priority under 35 U.S.C. §119(a-d) to Indian Patent Application No. 1828/CHE/2013 (non-provisional) entitled "VISUALIZING HIGH CARDINALITY CATEGORICAL DATA," filed Apr. 22, 2014, the entirety of which is incorporated herein by reference.

BACKGROUND

Data of high cardinality in categorical variables is becoming increasingly commonplace in very large data sets. This begets the challenge of presenting larger amounts of such data in a visualization that is compact and also easily understandable to enable useful conclusions to be derived from it.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

A computer-program product tangibly embodied in a non-transitory machine-readable storage medium, the computer-program product including instructions operable to cause a computing device to perform operations including: perform an association measurement between a target variable and each non-target variable of a data set to determine a degree of association between the target variable and each non-target variable; select non-target variables for inclusion in a visualization of the data set up to a maximum quantity of non-target variables for inclusion in the visualization based on the degree of association between each non-target variable and the target variable; perform correspondence analysis between target values of the target variable and non-target values of each selected non-target variable to determine degrees of closeness among the target variables and to determine degrees of closeness between the target values of the target variable and the non-target values of each of the selected non-target variables; order target value markers within a target row of the visualization based on the degrees of closeness among the target values of the target variable, wherein the target row corresponds to the target variable and each target value marker represents at least one of the target values; order non-target value markers within each non-target row of multiple non-target rows of the visualization based on the degrees of closeness between the non-target values of each of the selected non-target variables and the target values of the target variable, wherein each non-target row corresponds to one of the selected non-target variables and each non-target value marker represents a non-target value of the corresponding selected non-target variable; determine a width of each target value marker based on a frequency of occurrence of the target value represented by the target value marker in the data set; determine a width of each non-target value marker based on a frequency of occurrence of the non-target value represented by the non-target value marker in the data set; and cause generation, by circuitry, of the visualization, wherein the visualization includes the target row and the multiple non-target rows presented as parallel rows with connection markers emanating from the target value markers and extending among the non-target value markers.

The computing device caused to perform operations including order the non-target rows relative to the target row based on the degree of association of the non-target values of each of the non-target variables to the target values of the target variable.

The computing device caused to perform operations including determine a distance between each adjacent pair of the target value markers in the target row based on degree of closeness between the target values represented by the target value markers in each adjacent pair.

The computing device caused to perform operations including monitor controls of the computing device for an indication of manual operation to select at least one of a variable of the data set to become the target variable or the maximum quantity of non-target variables for inclusion in the visualization.

The computing device caused to perform operations including receive an indication via a network from a viewing device of a selection of at least one of a variable of the data set to become the target variable or the maximum quantity of non-target variables for inclusion in the visualization.

The computing device caused to perform operations including generate the visualization as a parallel sets visualization wherein: the target row and the multiple non-target rows are arranged as parallel horizontal rows; at least one connection marker extends between a target value marker of the target row and a non-target value marker of a non-target row that is adjacent to the target row; and at least one other connection marker extends between a non-target value marker of one non-target row and another non-target value marker of another non-target row that is adjacent to the one non-target row.

The computing device caused to perform operations including: present, by circuitry, the visualization on a display; and present, by circuitry, a menu on the display, wherein the menu includes at least one graphical control operable to alter at least one of a selection of the target variable, the maximum quantity of non-target variables, a selection of ordering of the non-target value markers within each non-target row, widths of the target value markers or the widths of the non-target value markers.

The computing device caused to perform operations including enable a viewing device to present the visualization on a display by transmitting preprocessed data including mapping data indicating ordering of the target value markers within the target row and ordering of the non-target value markers within each non-target row, and frequency data indicating frequencies of occurrence in the data set of each target value represented by each target value marker and frequencies of occurrence in the data set of each non-target value represented by each non-target value marker.

The computing device caused to perform operations including combine more than one of the target values into a cluster represented by a single target value marker of the target row in response to a quantity of target values of the target variable exceeding a maximum quantity of target value markers to be presented in the target row.

The computing device caused to perform operations including: monitor controls of the computing device for an indication of manual operation to select a specific target value combined into the cluster for separation from the cluster; and augment the target row with another target value marker representing the specific target value separately from the cluster.

The computing device caused to perform operations including augment the visualization with an indication of an opposite trend between a degree of representation of a specific target value and a degree of representation of the cluster in at least one non-target value, wherein the cluster includes the specific target value.

The computing device caused to perform operations including augment the visualization with an indication of at least one of which target value is most overrepresented or which target value is most underrepresented in a non-target value represented by a non-target value marker of one of the non-target rows.

The computing device caused to perform operations including generate by circuitry, the non-target value marker to provide the indication of which target value is most overrepresented or which target value is most underrepresented in the non-target value represented by the non-target value marker.

The computing device caused to perform operations including reorder the non-target value markers within at least one non-target row based on degree of representation of a selected target value in each non-target value represented by the non-target value markers within the at least one non-target row.

A computer-implemented method including: performing an association measurement between a target variable and each non-target variable of a data set to determine a degree of association between the target variable and each non-target variable; selecting non-target variables for inclusion in a visualization of the data set up to a maximum quantity of non-target variables for inclusion in the visualization based on the degree of association between each non-target variable and the target variable; performing correspondence analysis between target values of the target variable and non-target values of each selected non-target variable to determine degrees of closeness among the target variables and to determine degrees of closeness between the target values of the target variable and the non-target values of each of the selected non-target variables; ordering target value markers within a target row of the visualization based on the degrees of closeness among the target values of the target variable, wherein the target row corresponds to the target variable and each target value marker represents at least one of the target values; ordering non-target value markers within each non-target row of multiple non-target rows of the visualization based on the degrees of closeness between the non-target values of each of the selected non-target variables and the target values of the target variable, wherein each non-target row corresponds to one of the selected non-target variables and each non-target value marker represents a non-target value of the corresponding selected non-target variable; determining a width of each target value marker based on frequency of occurrence of the target value represented by the target value marker in the data set; determining a width of each non-target value marker based on frequency of occurrence of the non-target value represented by the non-target value marker in the data set; and causing generation, by circuitry, of the visualization, wherein the visualization includes the target row and the multiple non-target rows arranged as parallel rows with connection markers emanating from the target value markers and extending among the non-target value markers.

The computer-implemented method including ordering the non-target rows relative to the target row based on the degree of association of the non-target values of each of the non-target variables to the target values of the target variable.

The computer-implemented method including determining a distance between each adjacent pair of the target value markers in the target row based on degree of closeness between the target values represented by the target value markers in each adjacent pair.

The computer-implemented method including monitoring controls for an indication of manual operation to select at least one of a variable of the data set to become the target variable or the maximum quantity of non-target variables for inclusion in the visualization.

The computer-implemented method including receiving an indication via a network from a viewing device of a selection of at least one of a variable of the data set to become the target variable or the maximum quantity of non-target variables for inclusion in the visualization.

The computer-implemented method including generating the visualization as a parallel sets visualization wherein: the target row and the multiple non-target rows are arranged as parallel horizontal rows; at least one connection marker extends between a target value marker of the target row and a non-target value marker of a non-target row that is adjacent to the target row; and at least one other connection marker extends between a non-target value marker of one non-target row and another non-target value marker of another non-target row that is adjacent to the one non-target row.

The computer-implemented method including: presenting, by circuitry, the visualization on a display; and presenting, by circuitry, a menu on the display, wherein the menu includes at least one graphical control operable to alter at least one of a selection of the target variable, the maximum quantity of non-target variables, a selection of ordering of the non-target value markers within each non-target row, widths of the target value markers or the widths of the non-target value markers.

The computer-implemented method including enabling a viewing device to present the visualization on a display by transmitting preprocessed data including mapping data indicating ordering of the target value markers within the target row and ordering of the non-target value markers within each non-target row, and frequency data indicating frequencies of occurrence in the data set of each target value represented by each target value marker and frequencies of occurrence in the data set of each non-target value represented by each non-target value marker.

The computer-implemented method including combining more than one of the target values into a cluster represented by a single target value marker of the target row in response to a quantity of target values of the target variable exceeding a maximum quantity of target value markers to be presented in the target row.

The computer-implemented method including: monitoring controls of the computing device for an indication of manual operation to select a specific target value combined into the cluster for separation from the cluster; and augmenting the target row with an another target value marker representing the specific target value separately from the cluster.

The computer-implemented method including augmenting the visualization with an indication of an opposite trend between a degree of representation of a specific target value and a degree of representation of the cluster in at least one non-target value, wherein the cluster includes the specific target value.

The computer-implemented method including augmenting the visualization with an indication of at least one of which target value is most overrepresented or which target value is most underrepresented in a non-target value represented by a non-target value marker of one of the non-target rows.

The computer-implemented method including generating by circuitry, the non-value target marker to provide the indication of which target value is most overrepresented or which target value is most underrepresented in the non-target value represented by the non-target value marker.

The computer-implemented method including reordering the non-target value markers within at least one non-target row based on degree of representation of a selected target value in each non-target value represented by the non-target value markers within the at least one non-target row.

An apparatus including: a processor component; an association measure component for execution by the processor component to perform an association measurement between a target variable and each non-target variable of a data set to determine a degree of association between the target variable and each non-target variable, and select non-target variables for inclusion in a visualization of the data set up to a maximum quantity of non-target variables for inclusion in the visualization based on the degree of association between each non-target variable and the target variable; a correspondence analysis component for execution by the processor component to perform correspondence analysis between target values of the target variable and non-target values of each selected non-target variable to determine degrees of closeness among the target variables and to determine degrees of closeness between the target values of the target variable and the non-target values of each of the selected non-target variables, order target value markers within a target row of the visualization based on the degrees of closeness among the target values of the target variable, wherein the target row corresponds to the target variable and each target value marker represents at least one of the target values, and order non-target value markers within each non-target row of multiple non-target rows of the visualization based on the degrees of closeness between the non-target values of each of the selected non-target variables and the target values of the target variable, wherein each non-target row corresponds to one of the selected non-target variables and each non-target value marker represents a non-target value of the corresponding selected non-target variable; a frequency component for execution by the processor component to determine a width of each target value marker based on frequency of occurrence of the target value represented by the target value marker in the data set, and determine a width of each non-target value marker based on frequency of occurrence of the non-target value represented by the non-target value marker in the data set; and a user interface component (UI) component for execution by the processor component to cause generation, by circuitry, of the visualization, wherein the visualization includes the target row and the multiple non-target rows presented as parallel rows with connection markers emanating from the target value markers and extending among the non-target value markers.

The apparatus, wherein the ordering component orders the non-target rows relative to the target row based on the degree of association of the non-target values of each of the non-target variables to the target values of the target variable.

The apparatus including a spacing component for execution by the processing component to determine a distance between each adjacent pair of the target value markers in the target row based on degree of closeness between the target values represented by the target value markers in each adjacent pair.

The apparatus, wherein the UI component monitors controls for an indication of manual operation to select at least one of a variable of the data set to become the target variable or the maximum quantity of non-target variables for inclusion in the visualization.

The apparatus including a communications component for execution by the processor component to receive an indication via a network from a viewing device of a selection of at least one of a variable of the data set to become the target variable or the maximum quantity of non-target variables for inclusion in the visualization.

The apparatus including the display.

The apparatus including a communications component for execution by the processor component to transmit to a view device preprocessed data to enable the viewing device to present the visualization on a display, wherein the preprocessed data includes mapping data indicating ordering of the target value markers within the target row and ordering of the non-target value markers within each non-target row, and frequency data indicating frequencies of occurrence in the data set of each target value represented by each target value marker and frequencies of occurrence in the data set of each non-target value represented by each non-target value marker.

The apparatus including a clustering component for execution by the processor component to combine more than one of the target values into a cluster represented by a single target value marker of the target row in response to a quantity of target values of the target variable exceeding a maximum quantity of target value markers to be presented in the target row.

The apparatus, wherein: the UI component monitors controls for an indication of manual operation to select a specific target value combined into the cluster for separation from the cluster; and the clustering component augments the target row with another target value marker representing the specific target value separately from the cluster.

The apparatus, wherein the clustering component augments the visualization with an indication of an opposite trend between a degree of representation of a specific target value and a degree of representation of the cluster in at least one non-target value, wherein the cluster includes the specific target value.

The apparatus including a representation component for execution by the processor component to augment the visualization with an indication of at least one of which target value is most overrepresented or which target value is most underrepresented in a non-target value represented by a non-target value marker of one of the non-target rows.

The apparatus, wherein the representation component generates by circuitry, the non-value target marker provides the indication of which target value is most overrepresented or which target value is most underrepresented in the non-target value represented by the non-target value marker.

The apparatus, wherein the representation component reorders the non-target value markers within at least one non-target row based on degree of representation of a selected target value in each non-target value represented by the non-target value markers within the at least one non-target row.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

DETAILED DESCRIPTION

Figure 1:
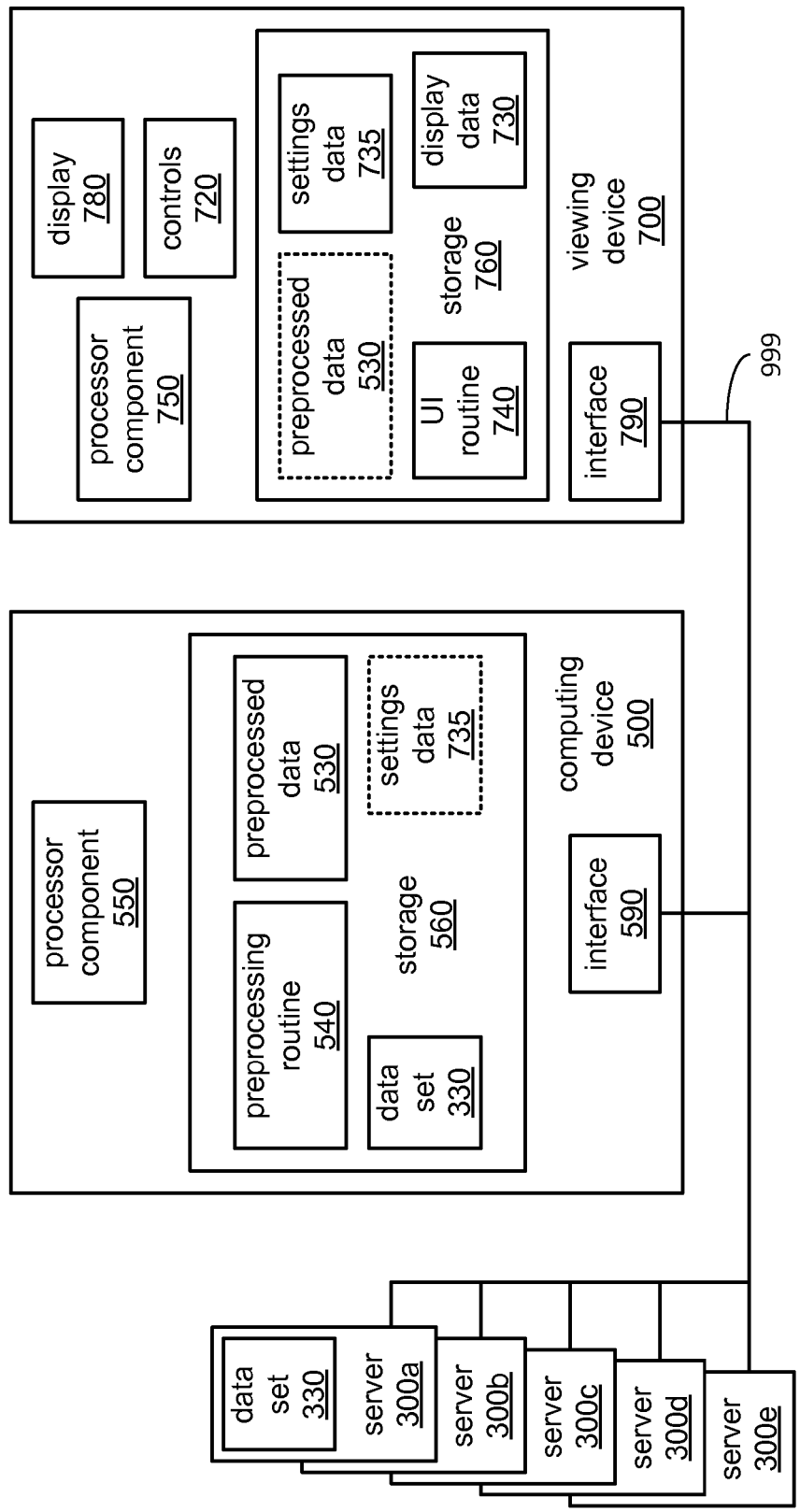
FIG. 1 illustrates an example embodiment of a visualization system.

Various embodiments described herein are generally directed to techniques for generating a parallel sets visualization of data having high cardinality in categorical variables. Up to a predetermined maximum quantity of non-target variables are selected to be presented in the parallel sets visualization along with a selected target variable based on correspondence analysis between the target variable and non-target variables. The order in which target value markers representing target values of the target variable are presented and the spacing between adjacent pairs of the target value markers may be derived from a numerical mapping based on a correspondence analysis among the target values of the target variable. The width of each target value marker may be based on the relative frequencies of the target values.

In some embodiments, the target variable and each of the non-target variables selected for presentation are presented in the parallel sets visualization in individual rows, with target values of the target variable presented in an uppermost target row by the target value markers. In some embodiment, which variable is the target variable may be selected by an operator of a computing device employed to generate the parallel sets visualization. The target variable markers may be colored with different colors assigned to each target value of the target variable, and connection markers emanating from each of the target value markers in the target row may be colored with matching colors. In some embodiments, which variables are selected to be the non-target variables that are included in the visualization may be determined based on degree of association of each with the target variable determined by association measurement.

In some embodiments, within each of the non-target rows, the non-target value markers representing non-target values of a non-target variable may be presented in an order based on the manner in which those non-target values are organized in the data set from which they were retrieved for presentation. Alternatively, the non-target value markers of each non-target row may be presented in an order derived from the degree of closeness among the non-target values. In some embodiments, the manner in which non-target value markers are ordered within the non-target rows may be made selectable by an operator of the computing device employed to generate the parallel sets visualization. Within each of the non-target rows, the width of each non-target value marker may be based on the relative frequencies of the non-target values they represent. However, the spacing between adjacent pairs of those graphical objects may be the same in some embodiments.

In some embodiments, two or more of the target values of the target variable may be combined into one or more clusters to reduce a quantity of target value markers required to represent all of the target values of the target variable if, for example, the quantity of target value markers would otherwise exceed a predetermined maximum quantity. In such embodiments, the analysis of degree of closeness among the target values of the target variable may be employed to determine which target values of the target variable are combined into one or more clusters. The predetermined maximum quantity of target value markers in the target row and/or the predetermined number of non-target variables to be presented may be made selectable by an operator of a computing device employed to generate the parallel sets graph.

One or more manually operable controls may be monitored for an indication of a command to control generation of the parallel sets visualization. Such commands may include a command to augment the parallel sets visualization with indications of which target values (e.g., categories) of the target variable are overrepresented and/or underrepresented to the greatest and/or least degree among values (e.g., other categories) of one or more of the non-target variables. Alternatively or additionally, such commands may include a command to change the ordering of non-target value markers within one or more of the non-target rows to be at least partly based on degree of overrepresentation and/or underrepresentation of one or more of the target values of the target variable.

With general reference to notations and nomenclature used herein, portions of the detailed description that follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of a visualization system 1000 incorporating one or more servers 300a-e, a computing device 500 and/or a viewing device 700. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc. Embodiments are not limited in this context.

As depicted, these computing devices 300a-e, 500 and 700 exchange communications conveying a data set 330 and/or preprocessed data 530 derived from the data set 330 through a network 999 in support of generating a visualization of at least a portion of the data of the data set 330. However, one or more of the computing devices 300a-e, 500 and/or 700 may exchange other data entirely unrelated to such visualizations with each other and/or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission.

The data set 330 may be any of a variety of types of data, including and not limited to, economic indicators, financial transactions, securities market prices, sales figures, production figures, census data, weather data, election results, etc. The data set 330 may be stored within one or more of the servers 300a-e awaiting retrieval by the computing device 500. Alternatively, the data set 330 may be compiled or otherwise derived from a search of greater quantities of data maintained by one or more of the servers 300a-e, the search conducted among one or more of the servers 300a-e in response to a request transmitted from the computing device 500. It should be noted that although a quantity of five servers 300a-e is specifically depicted, other quantities of computing devices may be employed in deriving and/or providing the data set 330 to the computing device 500.

In various embodiments, the computing device 500 incorporates one or more of a processor component 550, a storage 560 and an interface 590 to couple the computing device 500 to the network 999. The storage 560 may store one or more of each of the data set 330, a preprocessing routine 540, the preprocessed data 530 and settings data 735. In such embodiments, the computing device 500 may cooperate with the viewing device 700 to generate and present a visualization of at least a portion of the data set 330. More specifically, the computing device 500 may perform some degree of preprocessing of at least a portion of the data set 330 to derive the preprocessed data 530 made up of at least a subset of the data of the data set 330 to be presented by the viewing device 700.

In various embodiments, the viewing device 700 incorporates one or more of a processor component 750, a storage 760, a display 780, controls 720 and an interface 790 to couple the viewing device 700 to the network 999. The storage 760 may store one or more of each of the preprocessed data 530, the settings data 735, a user interface (UI) routine 740 and display data 730. The viewing device 700 may receive the preprocessed data 530 and may present the visualization of the data set 330 using the preprocessed data 530.

Figure 2:
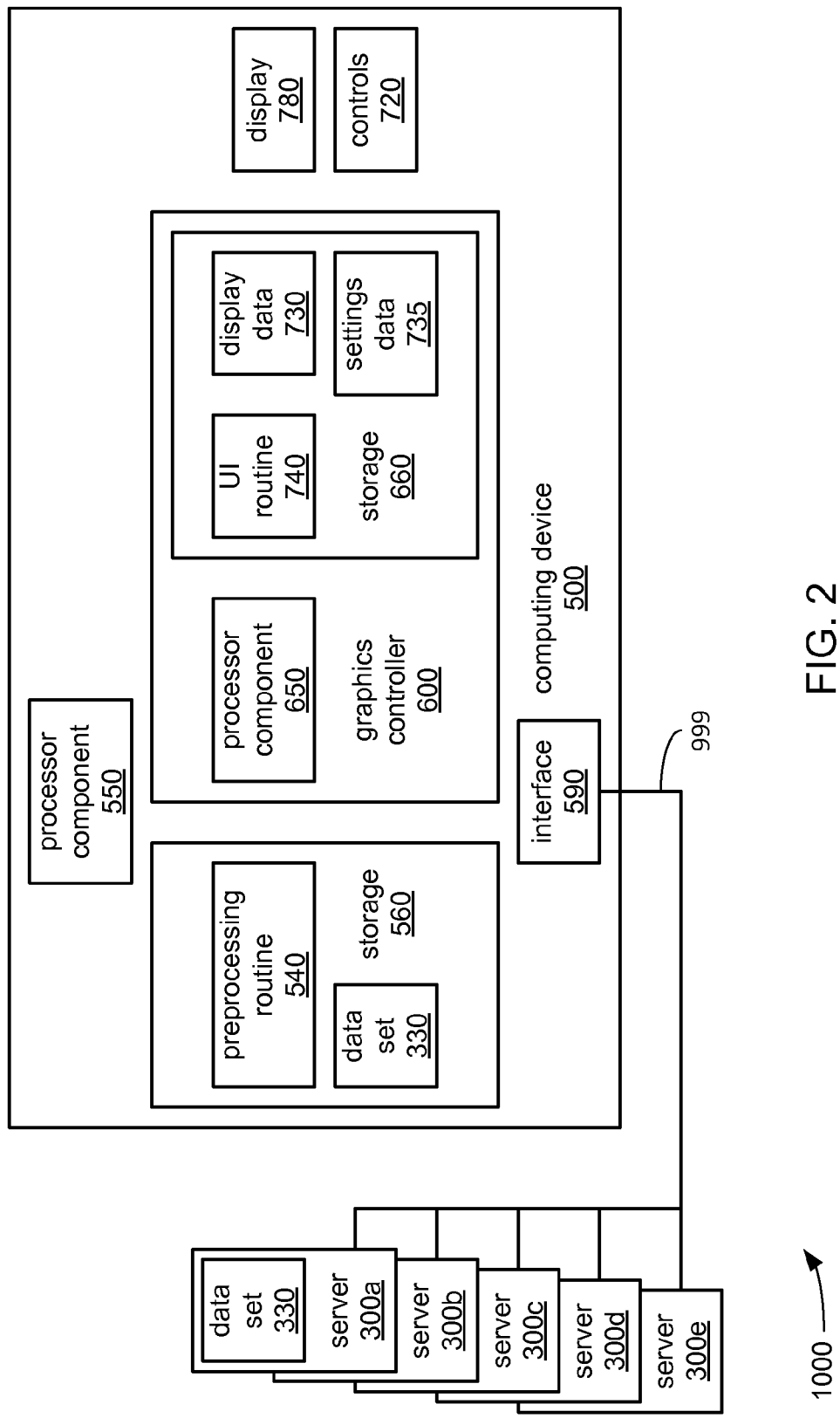
FIG. 2 illustrates an alternate example embodiment of a visualization system.

FIG. 2 illustrates a block diagram of an alternate example embodiment of the visualization system 1000 featuring an alternate embodiment of the computing device 500 that subsumes the visual presentation function of the viewing device 700 of FIG. 1. In FIG. 2, the alternate embodiment of the computing device 500 additionally incorporates one or more of a graphics controller 600, as well as the display 780 and the controls 720. The graphics controller 600 incorporates a processor component 650 and a storage 660. The storage 660 of the graphics controller 600 stores the settings data 735, the UI routine 740 and the display data 730. With these additional components, the alternate embodiment of the computing device 500 of FIG. 2 is able to directly present a visualization of at least a portion of the data set 330 without assistance from another device, unlike the embodiment of the computing device 500 of FIG. 1. More precisely, the graphics controller 600 of the embodiment of the computing device 500 of FIG. 2 performs the functions of the viewing device 700 of FIG. 1. However, still another alternate embodiment of the computing device 500 (not shown) is possible that may perform the functions of the viewing device 700 of FIG. 1, but not include the graphics controller 600.

Returning to FIG. 1, the preprocessing routine 540 and the UI routine 740 each incorporate a sequence of instructions operative on corresponding one(s) of the processor components 550, 650 and/or 750 to implement logic to perform various functions. The preprocessing routine 540 may be any of a variety of types of routine that retrieves and processes data from the data set 330 to generate the preprocessed data 530, including and not limited to, a database query application, a spreadsheet application, etc. The UI routine 740, for example, may be a UI component of an application routine, a UI component of an operating system (OS), etc. that uses the preprocessed data 530 to present a visualization.

In executing the preprocessing routine 540, the processor component 550 may receive at least a portion of the data set 330 from one or more of the servers 300a-e and/or may generate at least a portion of the data set 330. Regardless of the exact manner in which the data set 330 is received and/or generated, the data set 330 is preprocessed by the processor component 550 to generate the preprocessed data 530, and at least a portion of the data set 330 is conveyed from the preprocessing routine 540 to the UI routine 740 as part of the preprocessed data 530. More specifically, the preprocessed data 530 includes values of a selection of target and non-target variables from the data set 330 and various pieces of information derived by the preprocessing routine 540 indicative of various parameters for generating a parallel sets visualization of those values. The processor component 650 or 750, in executing the UI routine 740, then presents the parallel sets visualization on the display 780 based on the preprocessed data 530.

Figure 3:
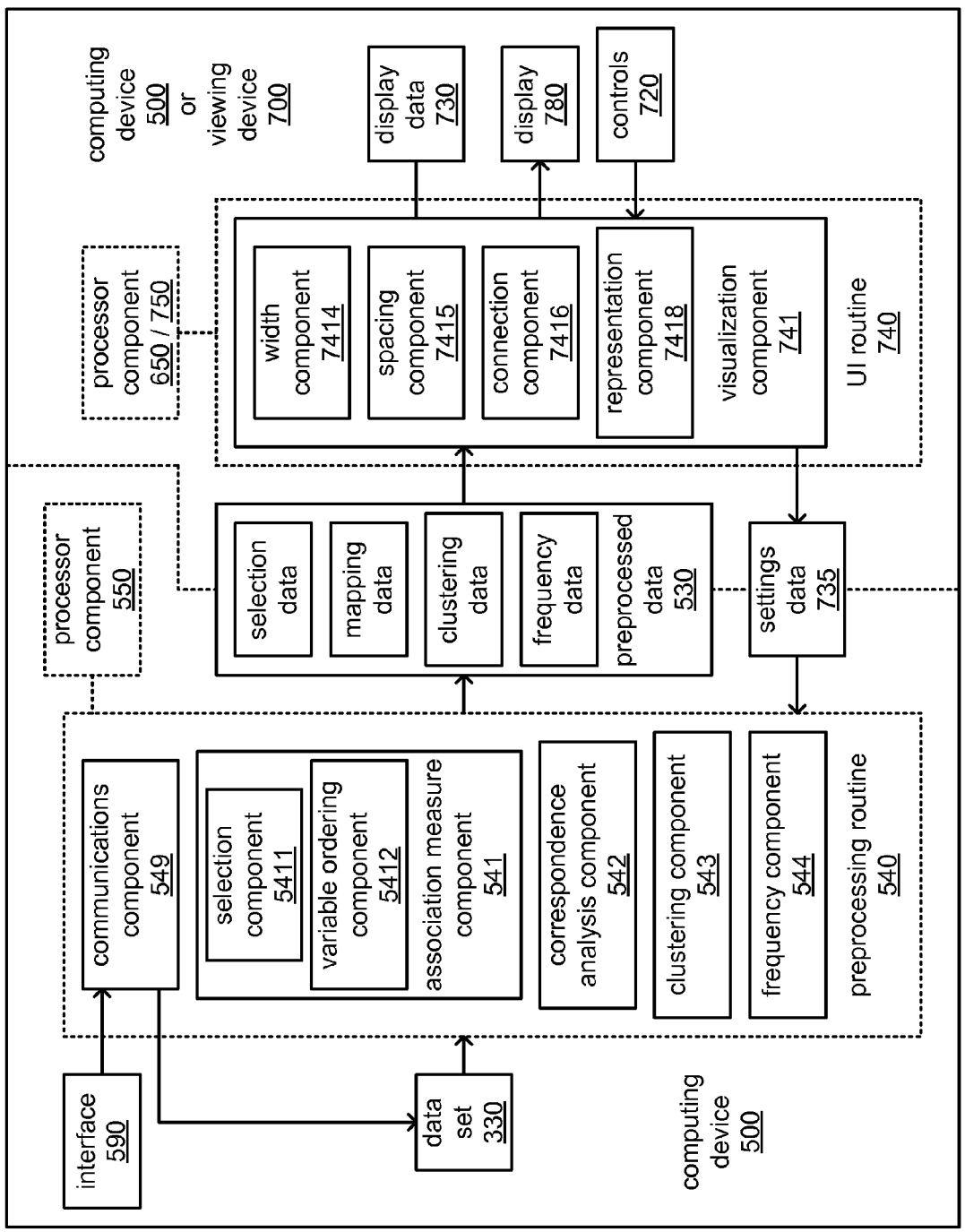
FIG. 3 illustrates an example of a portion of an embodiment of a visualization system.
Figure 4:
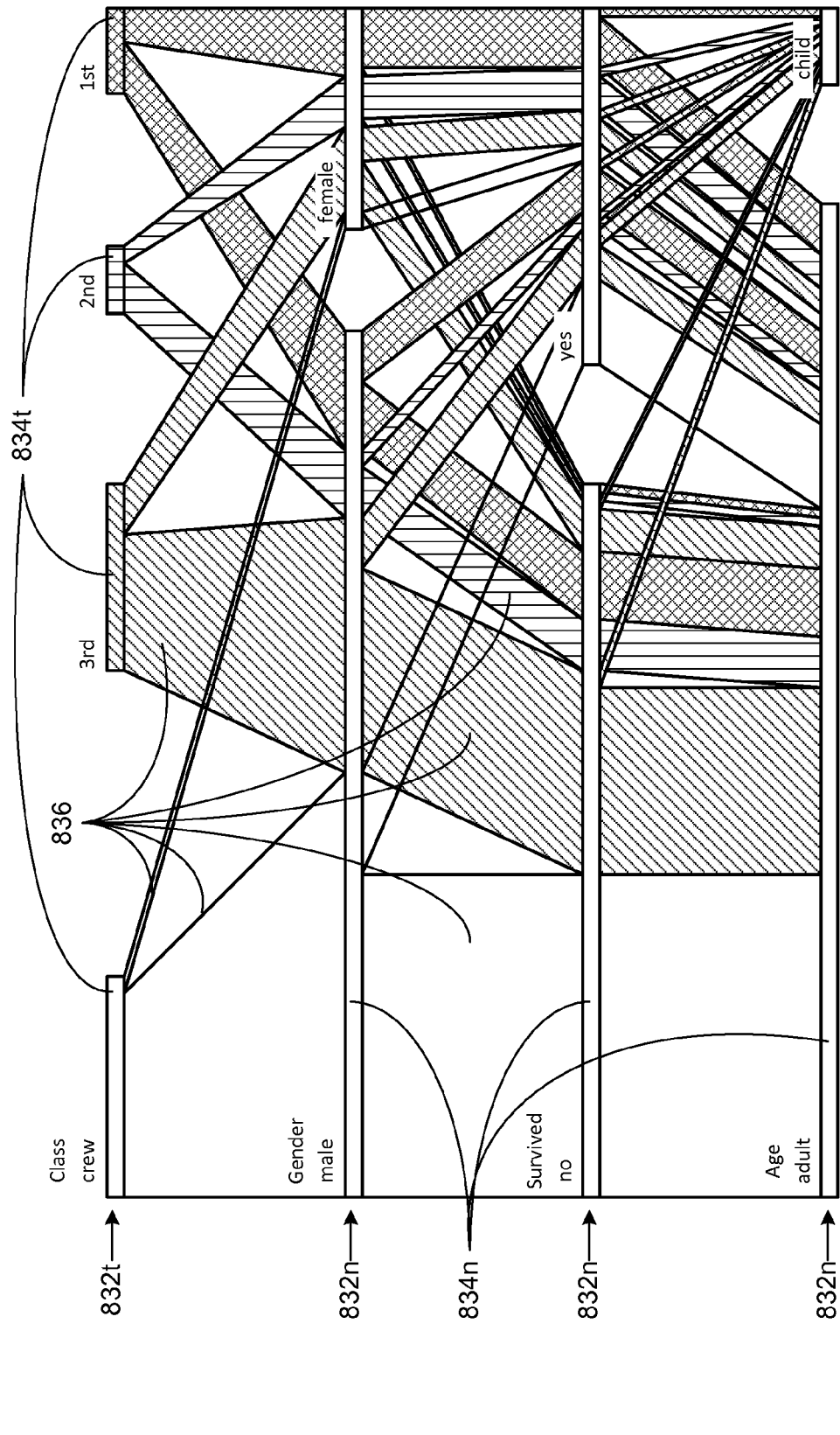
FIGS. 4, 5 and 6, together, illustrate an example embodiment of a visualization.
Figure 5:
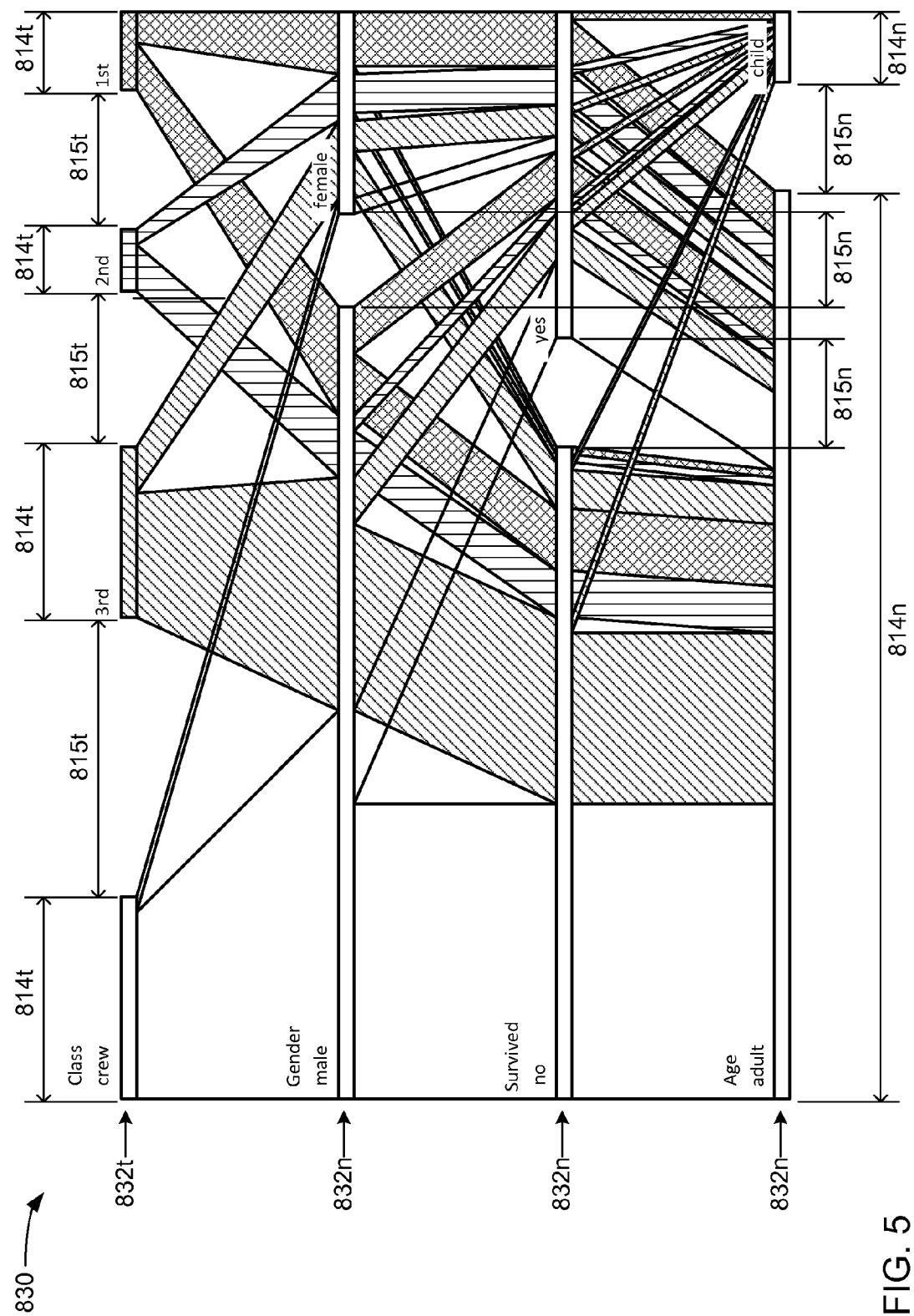
Figure 6:
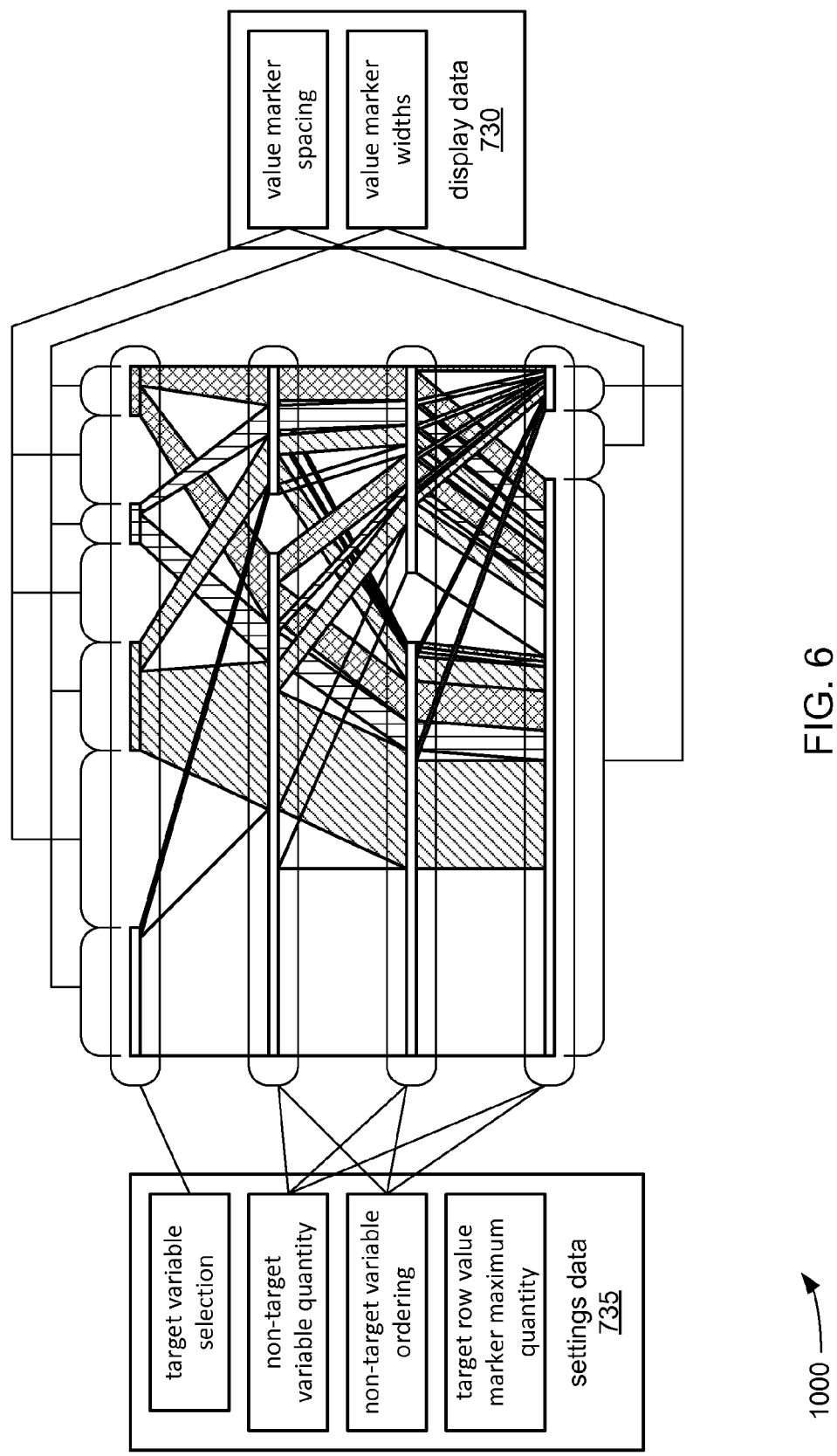

FIG. 3 depicts an example embodiment of such operation of either the combination of the computing device 500 and the viewing device 700 of FIG. 1, or the computing device 500 of FIG. 2. Additionally, FIGS. 4, 5 and 6, together, illustrate an example visualization 830 generated from the data set 330 and then presented on the display 780 by the embodiment of FIG. 3. More specifically, the FIGS. 4-6 illustrate an example visualization 830 of various statistics of persons on board the HMS Titanic at the time of its sinking in the Atlantic Ocean. It should be noted that a data set concerning persons on board Titanic is selected for use in the examples of visualizations presented herein due to its relative simplicity in terms of having relatively limited quantities of variables, target values and non-target values, thus lending itself to providing relatively uncluttered illustrations to facilitate understanding. However, it is to be understood that such use of such a relatively simple data set should not be construed as limiting what is disclosed and claimed herein to such relatively simple data sets. Indeed, it is envisioned that what is disclosed and claimed herein may be used with relatively large data sets incorporating a great many variables, each of which may have a great many values.

As depicted, the preprocessing routine 540 may incorporate one or more of an association measure component 541, a correspondence analysis component 542, a clustering component 543, a frequency component 544 and a communications component 549. Further, the association measure component 541 may incorporate one or more of a selection component 5411 and a variable ordering component 5412. In executing the preprocessing routine 540, the processor component 550 may execute one or more of the components 5411 and 5412 of the association measure component 541, as well as the correspondence analysis component 542, the clustering component 543, the frequency component 544 and the communications component 549. As also depicted, the UI routine 740 incorporates a visualization component 741, which may incorporate one or more of a width component 7414, a spacing component 7415, a connection component 7416 and a representation component 7418. In executing the UI routine 740, the processor component 650 or 750 may execute one or more of the components 7414, 7415, 7416, 7418 of the visualization component 741.

In preparation for generating a visualization of at least a portion of the data set 330, the communications component 549 may operate the interface 590 to receive at least a portion of the data set 330 from one or more of the servers 300a-e, as previously discussed. Alternatively or additionally, other mechanisms including removable storage media may be employed to convey one or more of these pieces of data to the computing device 500.

The correspondence analysis component 542 retrieves an indication from the settings data 735 (e.g., as shown in FIG. 6) of which variable of the data set 330 is selected as the target variable and the maximum quantity of non-target variables to be included in the visualization 830. The selections of a target variable and/or the maximum quantity of non-target variables indicated in the settings data 735 may be provided by an operator of the computing device 500 and/or the viewing device 700 through manual operation of the controls 720. Alternatively or additionally, indications of which variable is the target variable and/or the maximum quantity of non-target variables to include in the visualization 830 may be provided as part of (or otherwise accompany) the data set 330, at least as default selections. The selection of the target variable determines which variable of the data set 330 occupies the target row 832t, and the selection of the maximum quantity of non-target variables to include determines the maximum quantity of non-target rows 832n that may be included in the visualization 830. As depicted in this example visualization 830, the target variable is selected to be the class of each of the persons on board the Titanic at the time it sank, which includes the crew and 1st through 3rd class passengers as its categorical values.

Regardless of the manner in which the target variable and/or the maximum quantity of non-target variables to be included in the visualization are selected, the association measure component 541 may perform association measurements between the target variable and every non-target variable of the data set 330 to determine degrees of association between the target variable and each of the non-target variables. As familiar to those skilled in the art these association measurements may include correspondence analyses between the target variable and each of the non-target variables of the data set 330.

The selection component 5411 may employ the degrees of association to select the non-target variables with the highest degrees of association to the target variable up to the maximum quantity of non-target variables that are to be included in the visualization 830. Following selection of the non-target variables to be included in the visualization 830, the variable ordering component 5412 may determine the ordering of the non-target rows 832n by the degree of association of their associated ones of the selected non-target variables to the target variable. More precisely, the variable ordering component 5412 may order the non-target rows 832n of the visualization 830 to position the non-target row 832n associated with the selected non-target variable that has the highest degree of association with the target variable closest to the target row 832t.

With the target and non-target variables to be included in the visualization 830 having been selected, the correspondence analysis component 542 may perform correspondence analyses between the target variable and each of the selected non-target variables. Specifically, the correspondence analysis component 542 derives metrics of degrees of closeness among the target values of the target variable, and between the target values of the target variable and the non-target values of each of the selected non-target variables. From the metrics of degree of closeness among the target values of the target variable, the correspondence analysis component 542 derives a numerical mapping determining the order in which the target value markers 834t representing the target values of the target variable are arranged in the target row 832t.

In some embodiments, the ordering of non-target value markers 834n representing non-target values for each of the non-target variables within each of the non-target rows 832n may also be determined by the degree of closeness which is determined by correspondence analysis component 542. Alternatively, the ordering of non-target value markers 834n within each of the non-target rows 832n may be determined by the ordering of the non-target values they represent within the data set 330 or the order in which those non-target values are retrieved from the data set 330. In some embodiments, the manner in which the non-target value markers 834n of the non-target variables are ordered within each of the non-target rows 832n may be selected by an operator of the computing device 500 and/or of the viewing device 700, and therefore, may be retrieved by the correspondence analysis component 542 from the settings data 735. Thus, an indication of selection of ordering of non-target value markers 834n for the non-target rows 832n may be provided by an operator through manual operation of the controls 720.

The frequency component 544 analyzes the data set 330 to determine the frequency of occurrence in the data set 330 for each of the values of the target variable and of each non-target variable selected to be included in the visualization 830. By way of example, the frequency with which the non-target values "male" and "female" of the non-target variable "gender" occur in the data set 330 is based on how many of the persons on board the Titanic were male and how many were female, respectively. Thus, since there were many more males on board the Titanic when it sank, the non-target value "male" of the non-target variable "gender" has a greater frequency of occurrence within the data set 330 than the non-target value "female."

As previously discussed, the preprocessing routine 540 generates the preprocessed data 530 to be provided to the UI routine 740 to further enable generation of the visualization 830. The selection component 5411 includes portions of the data set 330 associated with the target variable and the non-target variables selected for inclusion in the visualization 830 in the preprocessed data 530. Portions of the data set 330 associated with non-target variables that are not selected for inclusion in the visualization 830 may not be included in the preprocessed data 530. In so doing, selection component 5411 may also generate and include in the preprocessed data 530 selection data indicating what variables are selected as the target variable and/or the non-target variables for inclusion in the visualization 830. Further, such selection data may include indications of the ordering determined by the variable ordering component 5412 of the non-target rows 832n of those selected non-target variables relative to the target row 832t. The correspondence analysis component 542 may generate and include in the preprocessed data 530 numerical mapping data indicating the ordering of target values of the target variable within the target row 832t, as well as the ordering of non-target values of the selected non-target variables within each of the non-target rows 832n. The frequency component 544 may generate and include frequency data indicating relative frequencies of occurrence of each value of the target variable and selected non-target variables in the preprocessed data 530.

As also previously discussed, in embodiments in which the preprocessing routine 540 and the UI routine 740 are executed in different ones of the computing device 500 and the viewing device 700, respectively, (as depicted in FIG. 1), the preprocessed data 530 may be conveyed therebetween via the network 999. Alternatively, the preprocessing routine 540 and the UI routine 740 may be executed within the same computing device 500 (as depicted in FIG. 2) such that transmission of the preprocessed data 530 between devices may be unnecessary. Regardless of the manner in which the preprocessed data 530 is made available to the UI routine 740, the UI routine 740 employs the preprocessed data 530 in cooperating with the preprocessing routine 540 to generate and present the visualization 830. In so doing, the UI routine 740 may store at least a portion of the visualization 830 as the display data 730 at least as a display buffer, for example, in preparation for presenting an image of the visualization 830 on the display 780.

The UI routine 740 employs indications of the target values for the target variable and the non-target values for each of the non-target variables to generate the target row 832t and each of the non-target rows 832n, respectively. Within the target row 832t, target value markers 834t visually present the target values of the target variable, and within each of the non-target rows 832n, non-target value markers 834n visually present the non-target values of the non-target variables selected to be included in the visualization 830. By way of example and as previously discussed, the variable "Class" (indicating the status of all persons on board Titanic) was selected as the target variable for the target row 832t, and the target values "crew", along with the values "3rd", "2nd" and "1st" for the passengers, are each visually presented with an individual target value marker 834t. As also depicted, the non-target variables "Gender", "Survived" and "Age" were selected as the non-target variables for inclusion in individual ones of the non-target rows 832n. The non-target values "male" and "female" of the non-target variable "Gender", the non-target values "yes" and "no" of the non-target variable "Survived", and the non-target values "adult" and "child" of the non-target variable "Age" are each also visually presented in their respective non-target rows 832n with an individual non-target value marker 834n. The UI routine 740 then automatically generates connection markers 836 extending between the value markers 834t and/or 834n of adjacent ones of the rows 832t and/or 832n to depict the relative quantities of persons on board the Titanic who are associated with each possible combination of target and non-target values (e.g., fit into each possible combination of values in the categories of Class, Gender, Survived status and Age).

In generating the target row 832t and the non-target rows 832n, the width component 7414 generates the value markers 834t and 834n within each row 832t and 832n with widths 814t and 814n, respectively, which are proportionate to the relative frequencies of each of the values within the row. By way of example, the widths 814n of the non-target value markers 834n for "male" and "female" in the non-target row 832n for the non-target variable "Gender" indicate the relative numbers of males versus females among the persons on board the Titanic. The width component 7414 may store indications of the widths of the value markers 834t and 834n as part of the display data 730 (e.g., as shown in FIG. 6).

Also in generating the target row 832t, the spacing component 7415 may position the target value markers 834t of the target row 832t with distances 815t between adjacent pairs of the target value markers 834t that reflect the relative degree of closeness of the target values they represent as earlier determined by the correspondence analysis component 542. Thus, the lesser distance 815t between the target value markers 834t for the target values "1st" and "2nd" indicates a higher degree of closeness between these two target values, and the greater distance 815t between the target value markers 834t for the target values "crew" and "3rd" indicates a lesser degree of closeness between those two target values. In contrast, in generating the non-target rows 832n, the spacing component 7415 may position the non-target value markers 834n of the non-target rows 832n equidistantly such that the spacing therebetween does not convey an indication of closeness. The spacing component 7415 may store indications of the distances between the value target value markers 834t and/or the non-target value markers 834n as part of the display data 730.

Each of the target value markers 834t in the target row 832t may be generated with a different color, which is depicted in the figures herein with different styles of cross-hatching. In generating the connection markers 836 extending between the value markers 834t and/or 834n of adjacent ones of the rows 832t and/or 832n, the connection component 7416 may generate each connection marker 836 with a color that matches the color of the target value marker 834t representing the target value that it is associated with in the target row 832t. Thus, all of the connection markers 836 in the series of connection markers 836 emanating from the target value marker 834t for the target value "1st" in the target row 832t and extending downward through the visualization 830 are generated with the same color as the target value marker 834t for the target value "1st."

It has been found through experimentation with real-word data sets that basing the width of each value marker 834t and 834n on frequency, ordering the value markers 834t and 834n in each row 832t and 832n based on degree of closeness, and spacing apart the target value markers 834t of the target row 832t based on degree of closeness tend to generate a visualization 830 in which there are fewer connection markers 836 that extend across a significant portion of the width of the visualization 830. This tends to result in the visualization 830 having a more organized appearance, and therefore appearing more easily understandable (and therefore, less intimidating) to a person viewing it.

Figure 7:
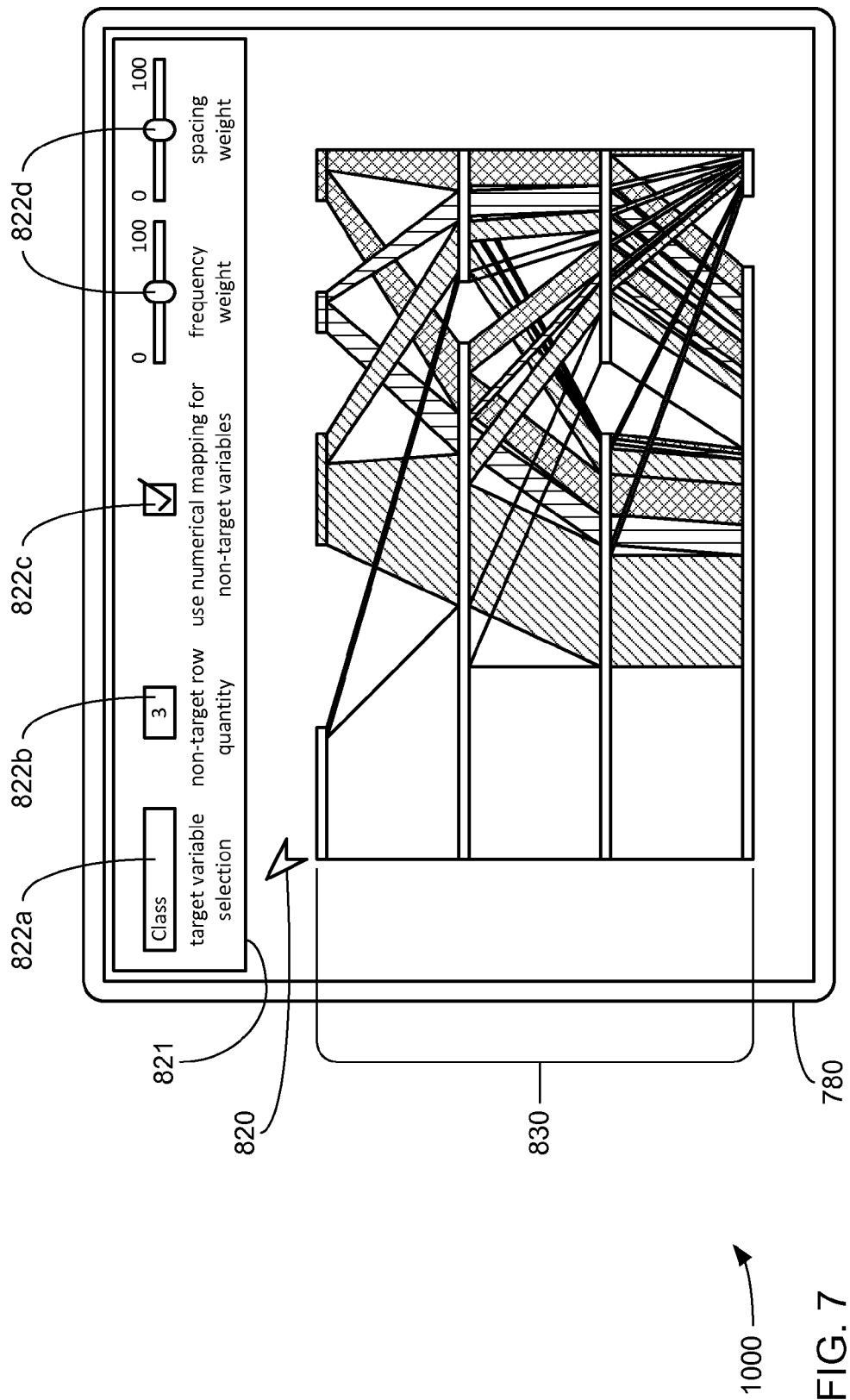
FIG. 7 illustrates an example embodiment of presenting a visualization on a display.

FIG. 7 illustrates an example of presentation of the example visualization 830 of FIGS. 4-6 on the display 780. It should be noted that, in the interests of reducing visual clutter, the text identifying the variables and their values in each of the rows 832t and 832n that would normally be present in the visualization 830 has been omitted in FIG. 7. As depicted, a visual portion of a graphical user interface (GUI) including a pointer 820 is also presented on the display 780 along with the visualization 830 to enable an operator to alter one or more parameters controlling aspects of the generation of the visualization 830. Specifically, within a menu 821, an entry box 822a is presented to enable any one of the variables of the data set 330 to be selected as the target variable. Also presented is another entry box 822b enabling the maximum quantity of non-target rows 832n to be selected. Further, a check box 822c is presented enabling a choice in ordering the non-target value markers 834n in the non-target rows 832n based either on degree of closeness or on the order in which the non-target values they represent are stored in the data set 330 (and/or retrieved therefrom). Still further, a pair of slide controls 822d are presented enabling the relative sizes of the widths of the value markers 834t and 834n, and of the spaces between them to be set by specifying the relative proportionate weights given to each.

In a manner familiar to those skilled in the art of graphical user interfaces (GUIs), the UI routine 740 may monitor the controls 720 for indications of manual operation to move the pointer 820 about the viewable area of the display 780 to operate one or more of the entry boxes 822a or 822b, the check box 822c and/or the slider controls 822d within the menu 821. In response to detecting such operation of the controls 720, the UI routine 740 may update various indications of settings in the settings data 735, and then provide the revised settings data 735 to the preprocessing routine 540 to trigger the generation of a new visualization of the data set 330 based on those new settings. Additionally, in some embodiments, the UI routine 740 may move the menu 821 in relation to the visualization 830 and/or, move the entry boxes 822a or 822b, the check box 822c and/or the slider controls 822 within the menu box 821 in response to other commands to do so.

Figure 8:
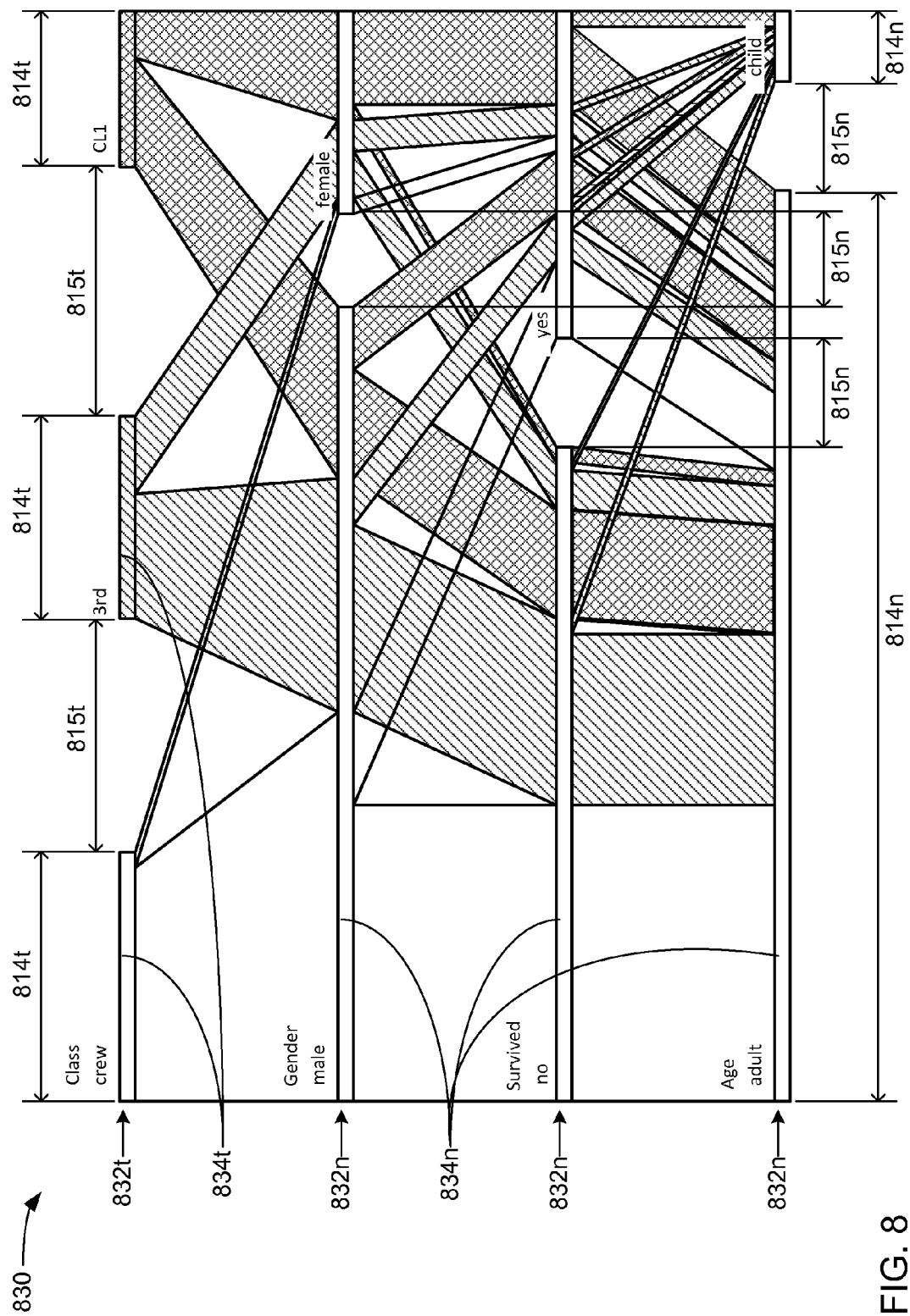
FIG. 8 illustrates an example embodiment of clustering in a visualization.

FIG. 8 illustrates an alternate example of the visualization 830 concerning persons on board the Titanic. This alternate example of FIG. 8 is similar to the example of FIGS. 4-7 in numerous ways, including the selections of the target and non-target variables. However, this alternate example shown in FIG. 8 illustrates an example of clustering together of two or more target values of the target variable to share a single target value marker 834t in the target row 832t to reduce visual clutter. Specifically, and referring back to FIG. 3, during execution of the preprocessing routine 540 to generate this alternate visualization 830, the clustering component 543 may retrieve an indication of a maximum quantity of target value markers 834t to be presented in the target row 832t from the settings data 735 (details of which may be best seen in FIG. 6). The clustering component 543 may then compare the quantity of target values to the maximum quantity of target value markers 834t to determine whether the quantity of target values exceeds the maximum quantity of target value markers 834t indicated in the settings data 735.

In the alternate example shown in FIG. 8, the maximum quantity of target value markers 834t in the target row 832t indicated in the settings data 735 is three, such that the quantity of four target values of the target variable "Class" (e.g., "crew", "3rd", "2nd" and "1st") exceeds that maximum quantity by one. In response, the clustering component 543 analyzes the degrees of closeness of each of these four target values to identify two target values to be combined based on having a relatively high degree of closeness. As previously discussed, (and as illustrated with the relatively small distance 815t between their target value markers 834t in FIGS. 4-7), the target values "1st" and "2nd" have the greatest degree of closeness between them of any possible pair of the target values of the target variable "Class." Thus, the clustering component 543 combines the target values "1st" and "2nd" into a single cluster "CL1" for which a single target value marker 834t is generated in the target row 832*t*, thereby resulting in there being only three target value markers 834*t* in the target row 832*t*.

Alternatively, in another embodiment, the clustering component 543 may not be provided with an indication of the maximum quantity of target value markers 834*t* to be presented in the target row 832*t*. Instead, the clustering component 543, in anticipation of a situation in which the quantity of target values may exceed the maximum quantity of target values markers 834*t* to be presented in the target row 832*t*, may derive one or more candidate clusters derived based on combining two or more target values that are selected based on degrees of closeness. The clustering component 543 may generate indications of different combinations of candidate clusters that may be created during generation of the alternate example of the visualization 830 depending on the degree to which the quantity of target values exceed the maximum quantity of target value markers 834*t*. The clustering component 543 may store indications of one or more of such candidate clusters as clustering data making up a portion of the preprocessed data 530.

The selection of non-target variables to occupy the non-target rows 832*n* by the selection component 5411 and the ordering among the target values of the target variable "Class" determined by the correspondence analysis component 542 do not change as a result of two or more of the target values being combined into one or more clusters (e.g., the combination of the target values "1st" and "2nd" to form the cluster "CL1"). However, the frequency component 544 may be caused to derive a single indication of frequency for the combination of the target values "1st" and "2nd" for use by the width component 7414 in generating the target value marker 234*t* for the cluster "CL1" alongside the target value markers 234*t* for the target values "crew" and "3rd" with proportionate widths. Further, the spacing component 7415 is caused to determine only two distances 815*t* between the target value markers 834*t* of the target row 832*t*.

The UI routine 740 may monitor the controls 720 for indications of manual operation thereof to convey a command to break apart the cluster "CL1" and to thereby cause the generation of a new visualization in which the target values "1st" and "2nd" are presented with individual target value markers 834*t* in the target row 832*t* (e.g., the example visualization 830 of FIGS. 4-7). By way of example, the UI routine 740 may monitor the controls 720 for indication of operation to select a target value marker 834*t* in the target row 832*t* associated with a cluster (e.g., the cluster "CL1"). In response, the UI routine 740 may display a listing of what target values are included in the selected cluster, and provide an option to select one or more of those target values to be separated out from the selected cluster such that the target row 832*t* is augmented with an additional target value marker 834*t* representing whichever target value is separated out from the cluster.

Figure 9:
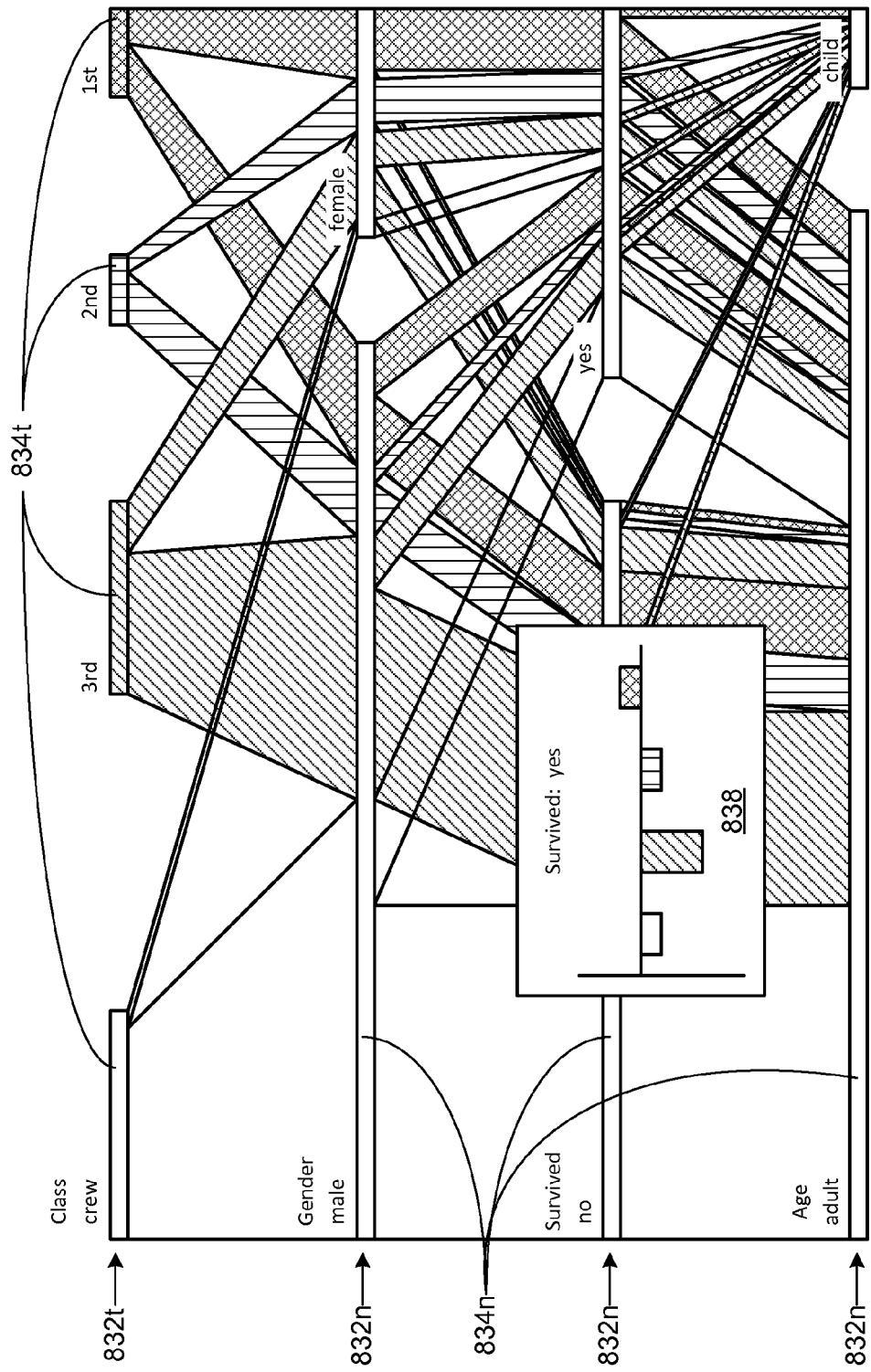
FIG. 9 illustrates an example embodiment of relative representation in a visualization.

FIG. 9 illustrates an example of presenting an indication of relative degrees of disproportionate representation of each of the target values of the target variable in one or more of the non-target values of a non-target variable. More specifically, the UI routine 740 may monitor the controls 720 for an indication of manual operation to command the presentation of a representation graph 838 indicating the degrees to which each of the target values of the target variable "Class" are either overrepresented or underrepresented in the non-target value "yes" of the non-target variable "Survived." Since a disproportionate number of the 1st class passengers survived the Titanic sinking while disproportionate numbers of all others did not, the representation graph 838 shows that the target value "1st" of the target variable "Class" is overrepresented in the non-target value "yes" of the non-target variable "Survived," while all other target values of the target variable "Class" are underrepresented. By way of example, such an operation of the controls 720 to cause the presentation of this example of the representation graph 838 may include operation of the controls 720 to move the pointer 820 to overlie and then select the non-target value marker 834*n* representing the non-target value "yes" in the non-target row 832*n* for the non-target variable "Survived."

In some embodiments, the representation graph 838 may include one or more graphical controls that enable an operator to select a target value to be highlighted in the visualization 830, etc. Alternatively or additionally, one or more of the target values within the representation graph 838 may be additionally be presented in numerical form in response to the pointer 820 (e.g., see FIG. 7) hovering over a portion of the representation graph 838. Also alternatively or additionally, the location of the representation graph 838 overlying the visualization 830 and/or the presented size of the representation graph 838 may be alterable.

Figure 10:
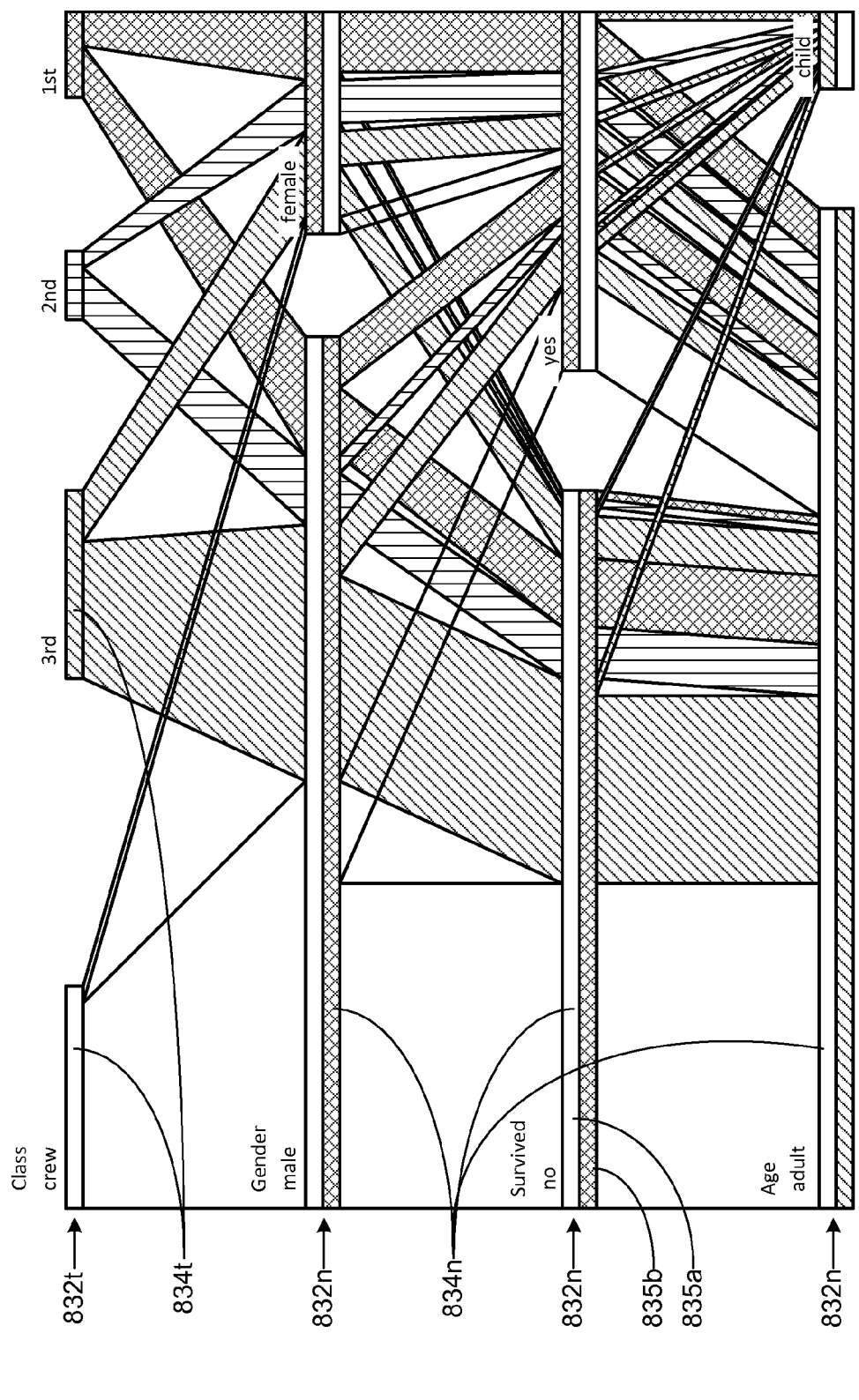
FIG. 10 illustrates another example embodiment of relative representation in a visualization.

Alternatively or additionally, the UI routine 740 may monitor the controls 720 for an indication of manual operation to command the presentation of indications of which values of the target variable are the most overrepresented and underrepresented for each non-target value of each non-target variable. FIG. 10 illustrates an example of presenting such indications for each non-target value of each non-target variable. More specifically, in response to detecting operation of the controls 720 to convey such a command, the representation component 7418 generates alternate forms of the non-target value markers 834*n* for each of the non-target values of the non-target variables. Each of those non-target value markers 834*n* is split into at least two visible portions 835*a* colored with the color of whichever target value of the target variable is overrepresented and 835*b* colored with the color of whichever target value of the target variable is underrepresented. By way of example, the portion 835*a* of the non-target value marker 834*n* for the non-target value "no" of the non-target variable "Survived" is colored with the color of the target value "crew" of the target variable "Class" to indicate the fact that the crew was the most overrepresented among the persons on board the Titanic who did not survive the sinking. Correspondingly, the portion 835*b* of the same non-target value marker 834*n* for the non-target value "no" of the non-target variable "Survived" is colored with the color of the target value "1st" of the target variable "Class" to indicate the fact that the 1st class passengers were the most underrepresented among the persons on board the Titanic who did not survive.

Also alternatively or additionally, the UI routine 740 may monitor the controls 720 for an indication of manual operation to command a reordering of the non-target value markers 834*n* of at least one of the non-target rows 832*n* into an order corresponding to the degree of overrepresentation and/or underrepresentation of a specific one of the target values of the target variable. Such ordering may be either an increasing or decreasing order of representation of that specific target value from left-to-right across the length of one or more of the non-target rows 832*n*.

Figure 11:
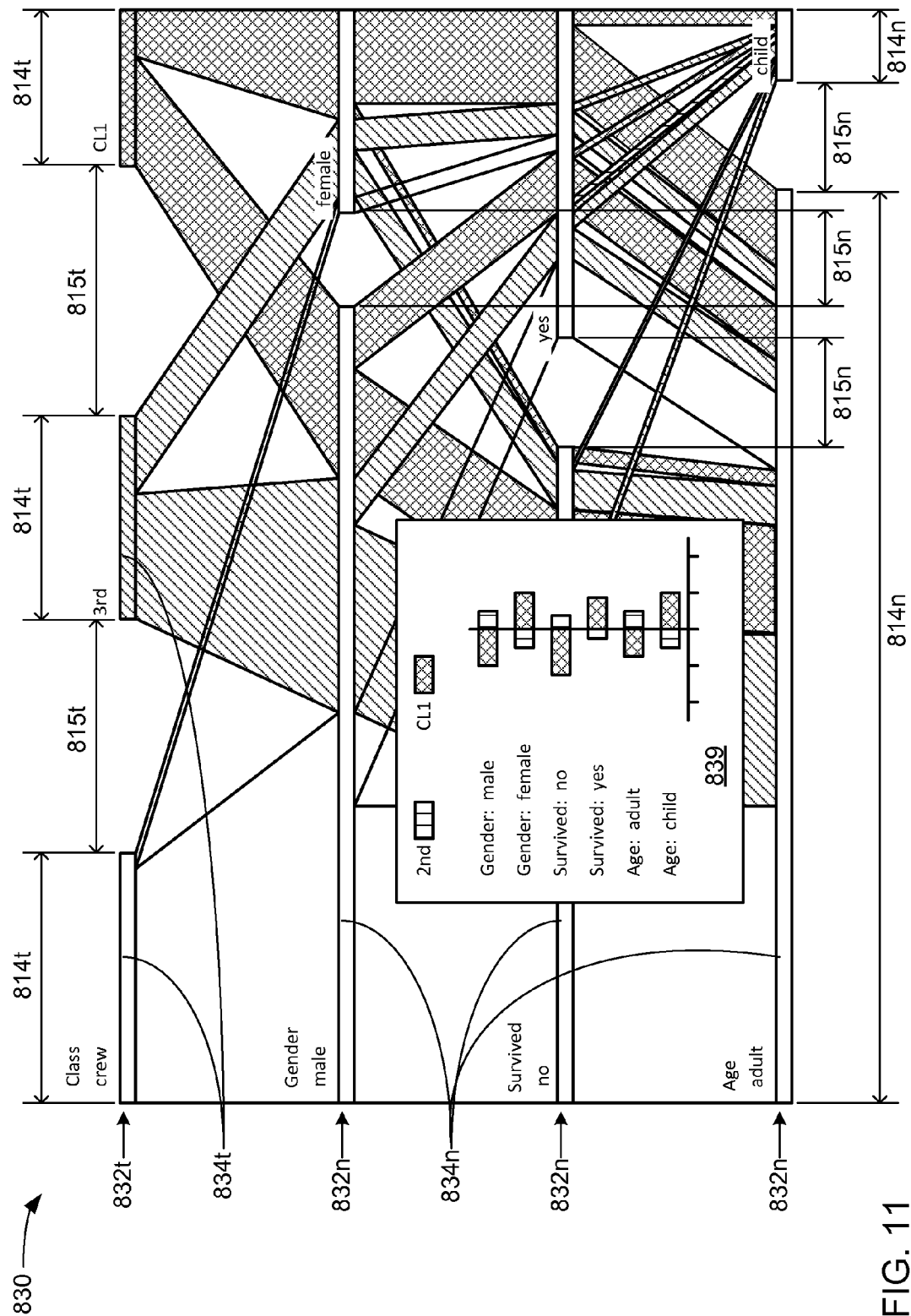
FIG. 11 illustrates an example embodiment of opposite trends in a visualization.

FIG. 11 illustrates an example of visually presenting an indication of opposite trends in degrees of disproportionate representation between a cluster of the target row 832*t* and one of the target values making up that cluster. More specifically, FIG. 11 depicts the same alternate example of visualization 830 of FIG. 8 that includes the cluster "CL1" overlain with an opposite trends graph 839 providing an indication of opposite trends in disproportionate representation of the target value "2nd" versus the cluster "CL1" in each of the non-target values of all of the non-target rows 832n. As depicted, the target value "2nd" is overrepresented to varying degrees in each of the non-target values "male," "no" and "adult," while the cluster "CL1" is overrepresented to varying degrees in each of the non-target values "female," "yes" and "child." Further, in each of these six non-target values, each of the target value "2nd" and the cluster "CL1" is underrepresented where the other is overrepresented such that they exhibit opposite trends from each other. As familiar to those skilled in the art, despite a high degree of closeness resulting in the target values "1st" and "2nd" being combined into the same cluster "CL1" (as previously described), it is possible for one or both of these target values to exhibit representational trends that are at least somewhat opposite of the representational trends of the cluster to which they belong. Not unlike the representation graph 838, in some embodiments, the opposite trends graph 839 may include one or more graphical controls that enable an operator to select a target value to be highlighted in the visualization 830, etc. Alternatively or additionally, one or more of the target values within the opposite trends graph 839 may be additionally be presented in numerical form in response to the pointer 820 hovering over a portion of the opposite trends graph 839. Also alternatively or additionally, the location of the opposite trends graph 839 overlying the visualization 830 and/or the presented size of the opposite trends graph 839 may be alterable.

Returning to FIGS. 1 and 2, in various embodiments, each of the processor components 550, 650 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

Although each of the processor components 550, 650 and 750 may include any of a variety of types of processor, it is envisioned that the processor component 650 of the graphics controller 600 of the embodiment of the computing device 500 of FIG. 2 may be somewhat specialized and/or optimized to perform tasks related to graphics, including graphics rendering. More broadly, it is envisioned that the graphics controller 600 serves as a graphics subsystem of the computing device 500 to enable the performance of tasks related at least to graphics rendering, using components separate and distinct from the processor component 550 and its more closely related components.

In various embodiments, each of the storages 560, 660 and 760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 590 and 790 may employ any of a wide variety of communications technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 12:
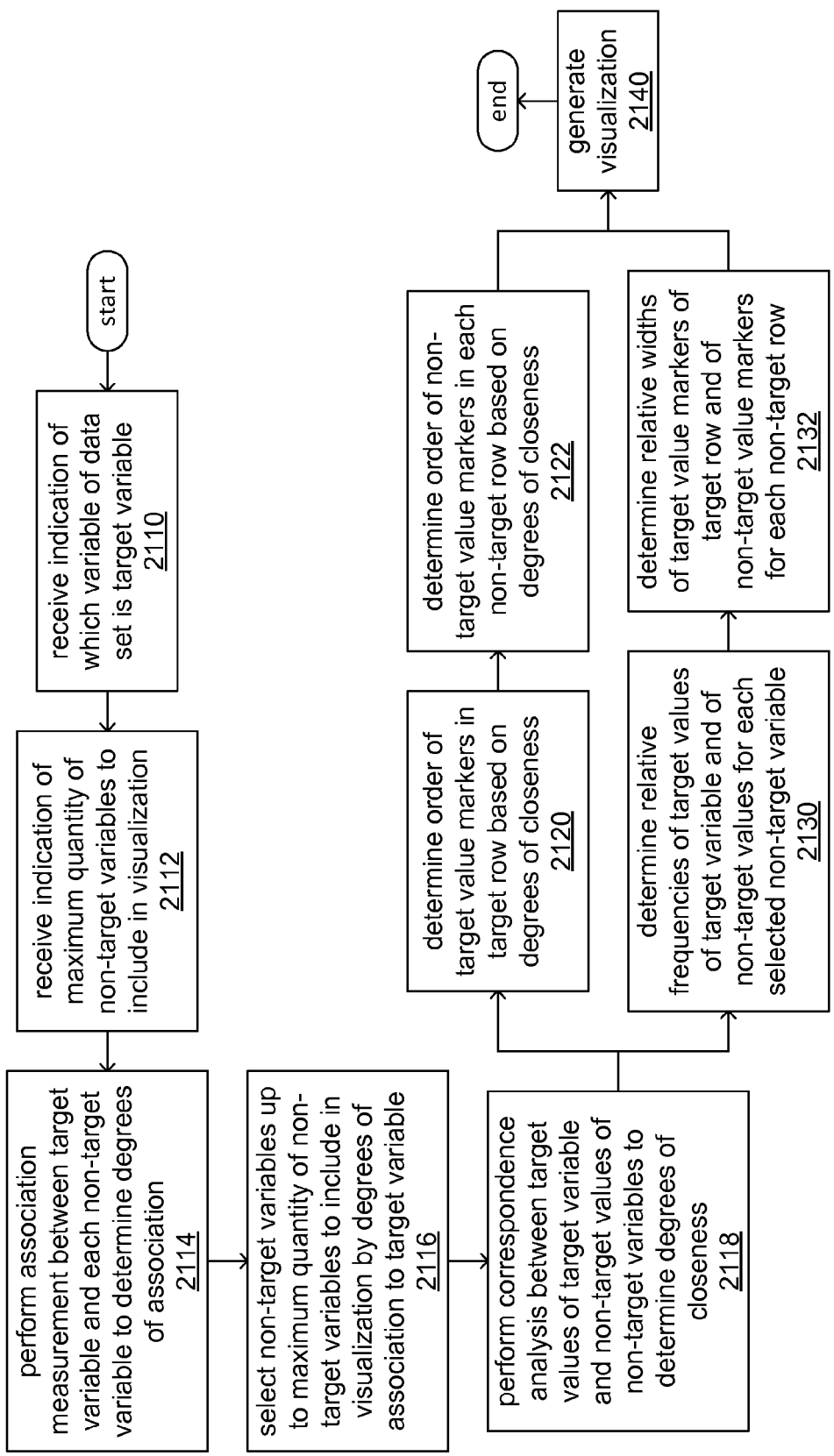
FIG. 12 illustrates an example embodiment of a logic flow of preprocessing a data set and generating a visualization therefrom.

FIG. 12 illustrates an example embodiment of a logic flow 2100. The logic flow 2100 may be representative of some or all of the operations executed by one or more embodiments described herein. More specifically, the logic flow 2100 may illustrate operations performed by the processor components 550 and/or 650 in executing the preprocessing routine 540 and/or the UI routine 740, and/or performed by other component(s) of at least the computing device 500 and/or the controller 600 in generating a visualization 830 on the display 780.

At 2110, a processor component of a computing device (e.g., the processor component 550 of the computing device 500) may receive an indication of which variable of multiple variables of a data set (e.g., the data set 330) is selected to be the target variable in a visualization of the data set (e.g., the visualization 830). As previously discussed, the processor component may either monitor controls and/or other components of the computing device for an indication of operator input indicating which variable is the target variable (e.g., through operation of controls 720 and/or of a pointer 820 of a GUI), or the processor component may receive an indication of operation of controls of another computing device (e.g., the viewing device 700) to provide such operator input. In still other embodiments, an indication of a default selection of one of the variables of the data set to be the target variable may be included in (or otherwise accompany) the data set.

At 2112, the processor component may receive an indication of the maximum quantity of non-target variables that are to be included in the visualization along with the target variable. As previously discussed, the maximum quantity of non-target variables to be included in the visualization sets the maximum quantity of non-target rows to be included in the visualization. Again, as with the indication of which variable is the target variable, the indication of the maximum quantity of non-target rows may be provided through manual operation of controls. In still other embodiments, an indication may be stored within the computing device (or within another device coupled to the display on which the visualization is to be presented) of a default maximum quantity of non-target variables to be included in the visualization, and this default maximum quantity may be based on a characteristic of the display to be used, such as its resolution and/or the size of its viewing area.

At 2114, the processor component performs association measurements between the target variable and each non-target variable of the data set to determine the degree of association of each non-target variable to the target variable. As previously discussed, the non-target variables are all of the variables of the data set that were not selected to be the target variable. At 2116, the processor component selects up to the maximum quantity of non-target variables to be included in the visualization based on the degree of association of each non-target variable to the target variable. At 2118, the processor component performs correspondence analysis of target values of the selected target variable and non-target values of the selected non-target variables.

At 2120, the processor component determines the order of the target value markers within the target row based on degrees of closeness of the target values represented by those target markers. Correspondingly, at 2122, the processor component determines the order of the non-target value markers within each of the non-target rows based on degrees of closeness of the non-target values represented by those non-target value markers to the target values of the target variable. As previously discussed, indications of the ordering of the target value markers within the target row and indications of the ordering of the non-target values markers within each of the non-target rows may be stored as mapping data making up a portion of a preprocessed data (e.g., the mapping data of the preprocessed data 530).

At 2130, the processor component determines the relative frequencies of each of the target values of the target variable, and of each of the non-target values of each of the non-target variables selected for inclusion in the visualization. At 2132, the processor component determines the relative widths of the target value markers of the target row based on the relative frequencies of the target values they represent, and determines the relative widths of the non-target value markers within each of the non-target rows based on the relative frequencies of the non-target values that they represent. As depicted, 2130 and/or 2132 may be performed in parallel with 2120 and/or 2122. As previously discussed, indications of the relative frequencies of the target values of the target variable, and indications of the relative frequencies of the non-target values of each of the non-target variables selected for inclusion in the visualization may be stored as frequency data making up a portion of the preprocessed data (e.g., the frequency data of the preprocessed data 530).

At 2140, at least the indications of ordering of target value markers and non-target value markers, and the indications of frequencies of target values and non-target values of the target variable and selected non-target variables, respectively, are employed to generate the visualization. As previously discussed, in some embodiments, the processor component of the computing device (or another processor component of a graphics controller of the computing device, such as the processor component 650 of the graphics controller 600) may generate the visualization and/or present the visualization on a display. However, in other embodiments, the processor component of the computing device may operate an interface coupling the computing device to a network to transmit preprocessed data that includes such indications to a separate viewing device to generate and/or present the visualization on a display.

Figure 13A:
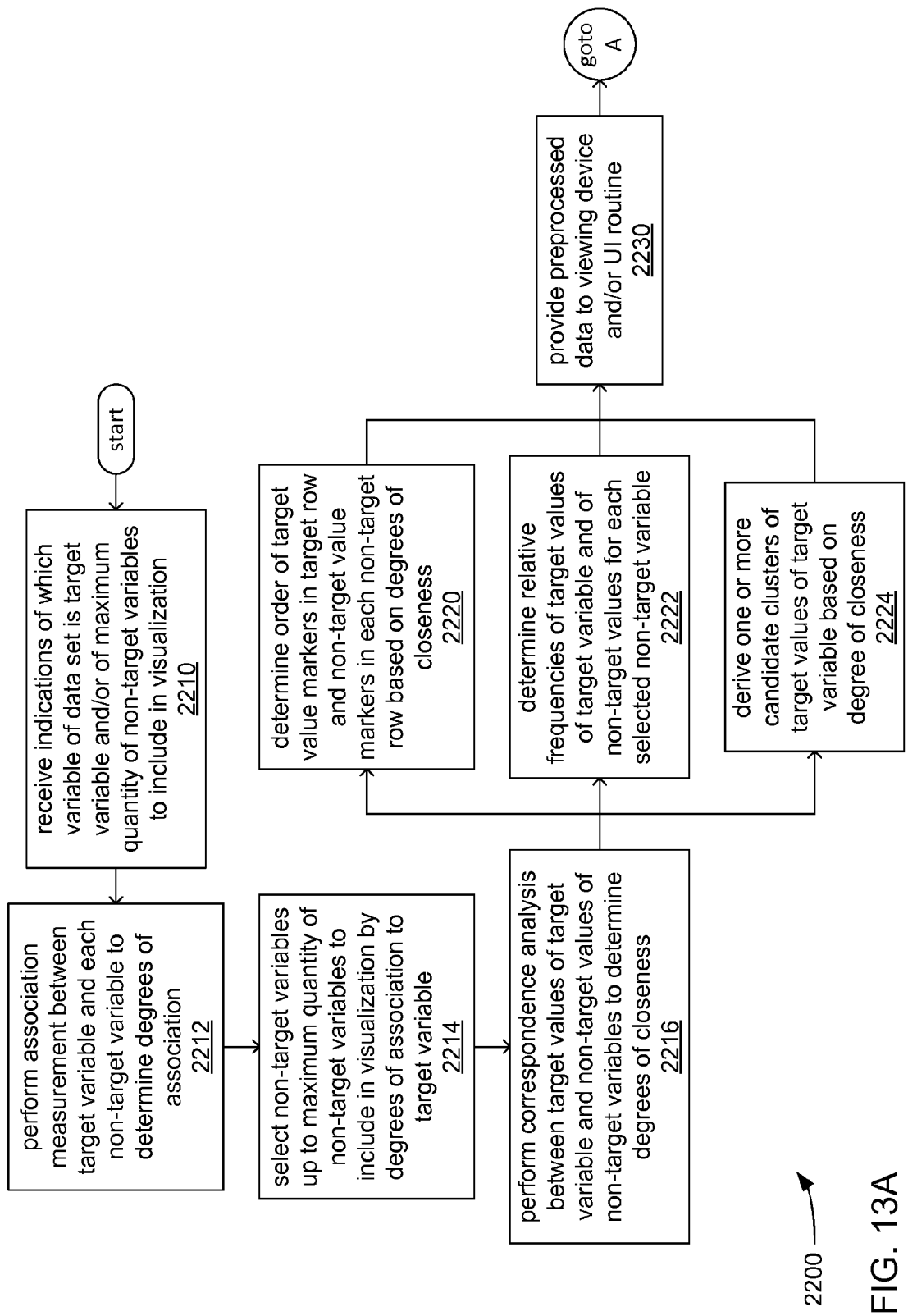
FIGS. 13A and B, together, illustrate an example embodiment of a logic flow of preprocessing a data set and generating a visualization that may include at least one cluster therefrom.
Figure 13B:
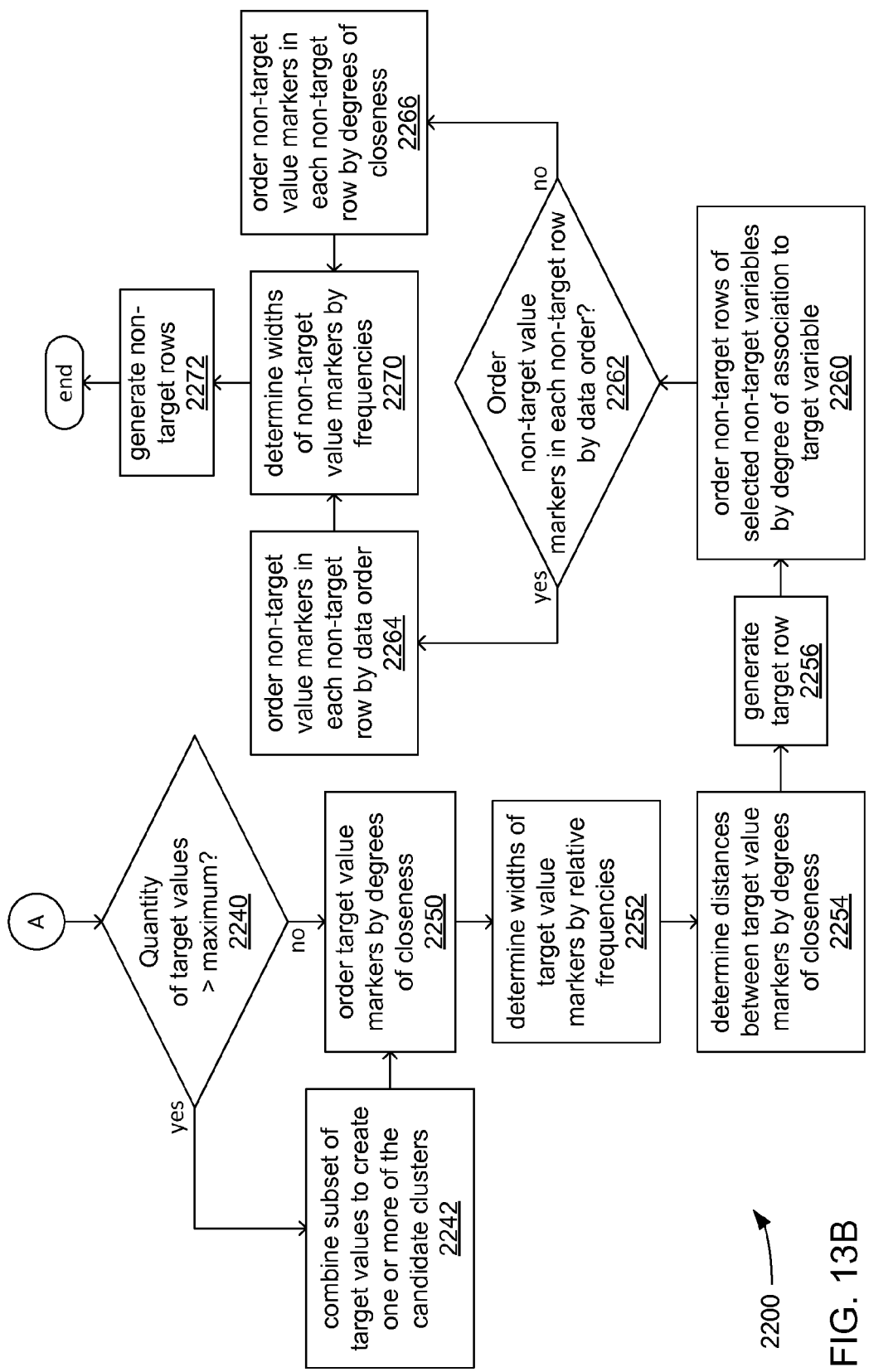

FIGS. 13A and 13B, together, illustrate an example embodiment of a logic flow 2200. The logic flow 2200 may be representative of some or all of the operations executed by one or more embodiments described herein. More specifically, the logic flow 2200 may illustrate operations performed by the processor components 550, 650 and/or 750 in executing the preprocessing routine 540 and/or the UI routine 740, and/or performed by other component(s) of at least the computing device 500, the controller 600 and/or the viewing device 700 in generating a visualization 830 on the display 780.

Turning to FIG. 13A, at 2210, a processor component of a computing device (e.g., the processor component 550 of the computing device 500) may receive an indication of which variable of multiple variables of a data set (e.g., the data set 330) is selected to be the target variable in a visualization of the data set (e.g., the visualization 830). The processor component may also receive an indication of the maximum quantity of non-target variables that are to be included in the visualization along with the target variable. Again, such indications may be provided to the processor component through monitoring of controls (e.g., the controls 720) and/or other components of the computing device, and/or may be received from another computing device (e.g., the viewing device 700). Again, such indications may include a default selection of a variable as the target variable and/or a default selection of the maximum quantity of non-target variables (and thus, the maximum quantity of non-target rows) to include in the visualization.

At 2212, the processor component performs association measurements between the target variable and each of the non-target variables of the data set to determine a degree of association of each of the non-target variables to the target variable. At 2214, the processor component selects up to the maximum quantity of non-target variables to be included in the visualization based on degrees of association of the non-target variables to the target variable. At 2216, the processor component performs correspondence analysis of target values of the selected target variable and non-target values of the other variables of the data set.

At 2220, the processor component may determine the order of the target value markers within the target row based on degrees of closeness of the target values represented by those target markers. The processor component may also determine the order of the non-target value markers within each of the non-target rows based on degrees of closeness of the non-target values represented by those non-target value markers. Again, indications of the ordering of the target value markers within the target row and indications of the ordering of the non-target values markers within each of the non-target rows may be stored as mapping data making up a portion of a preprocessed data (e.g., the mapping data of the preprocessed data 530).

At 2222, the processor component determines the relative frequencies of each of the target values of the target variable, and of each of the non-target values of each of the non-target variables selected for inclusion in the visualization. The processor component also determines the relative widths of the target value markers of the target row based on the relative frequencies of the target values they represent, and determines the relative widths of the non-target value markers within each of the non-target rows based on the relative frequencies of the non-target values that they represent. Again, indications of the relative frequencies of the target values of the target variable, and indications of the relative frequencies of the non-target values of each of the non-target variables selected for inclusion in the visualization may be stored as frequency data making up a portion of the preprocessed data (e.g., the frequency data of the preprocessed data 530).

At 2224, the processor component derives one or more candidate combinations of target values of the target variable to form one or more possible candidate clusters based on degrees of closeness of the target values. More specifically, candidate clusters may be derived by combining target values that have a higher degree of closeness to each other than other target values. As previously discussed, the quantity of target values of the target variable may exceed the maximum quantity target value markers to be included in the target row such that two or more of the target values may be combined to form one or more clusters of target values, thereby enabling the inclusion of no more than the maximum quantity of target value markers in the target row. Not unlike the selection of which variable of the data set is the target variable and/or the selection of a maximum quantity of non-target variables (and thus, non-target rows) to include in the visualization, the maximum quantity of target value markers to be presented in the target row of the visualization may be received from an operator via monitoring for operation of controls of the computing device or of a viewing device. As also previously discussed, indications of candidate cluster(s) that may be formed from two or more target values may be stored as clustering data making up a portion of the preprocessed data (e.g., the clustering data of the preprocessed data 530).

At 2230, the processor component may provide the preprocessed data to a viewing device (e.g., the viewing device 700) and/or to a UI routine (e.g., the UI routine 740). Again, the preprocessed data may include one or more of the mapping data generated at 2220, the frequency data generated at 2222 and the clustering data generated at 2224. As previously discussed, preprocessed data may be conveyed from a computing device to a viewing device via a network to enable a UI routine executed within the viewing device to generate the visualization and/or present the visualization on a display. However, as also previously discussed, the processor component may convey the preprocessed data (or its equivalent in the form of separate ones of mapping data, frequency data and/or clustering data) to a UI routine executed within the computing device by the processor component or by another processor component of a graphics controller of the computing device to generate and/or present the visualization on a display.

Continuing by turning to FIG. 13B, at 2240, a check is made as to whether the quantity of target values of the target variable exceeds the maximum quantity. At 2242, if the quantity of target values does exceed the maximum quantity of target value markers, then two or more of the target values are selected to be combined to form one or more of the candidate clusters indicated in the clustering data.

At 2250, the target value markers are ordered by degrees of closeness of the target values they represent as indicated in the mapping data. This includes target value markers that represent clusters of more than one target value. At 2252, the widths of each target value marker (whether for an individual target value or for a cluster of target values) are determined based on the relative frequencies of occurrence in the data set of the target value(s) that each target value marker represents as indicated in the frequency data. With the ordering and widths of target value markers known, the distances between adjacent ones of the target value markers are determined based on degree of closeness at 2254. At 2256, the target row is generated on the display. As previously discussed, each of the target value markers may be presented within the target row with a unique color.

At 2260, the degrees of association are used to derive an order of the selected non-target variables relative to the target variable in the visualization. More specifically, a determination is made as to which of the selected non-target variables will occupy which of the non-target rows. At 2262, a check is made as to whether the ordering of non-target value markers within each of the non-target rows is to be determined by the order in which the non-target values they represent are stored as data in the data set (and/or the order in which they are retrieved from the data set). If yes, then the non-target value markers are so ordered within each of the non-target rows at 2264. However, if not, then the non-target value markers are ordered within each of the non-target rows based on degree of closeness among the non-target values that the non-target value markers represent at 2266.

Regardless of the manner in which the non-target value markers are ordered, at 2270, the widths of each of the non-target value markers in each of the non-target rows are determined based on the frequency of occurrence in the data set of the non-target value(s) that each non-target value marker represents. With the widths of the non-target value markers known, each of the non-target rows are generated at 2272.

Figure 14:
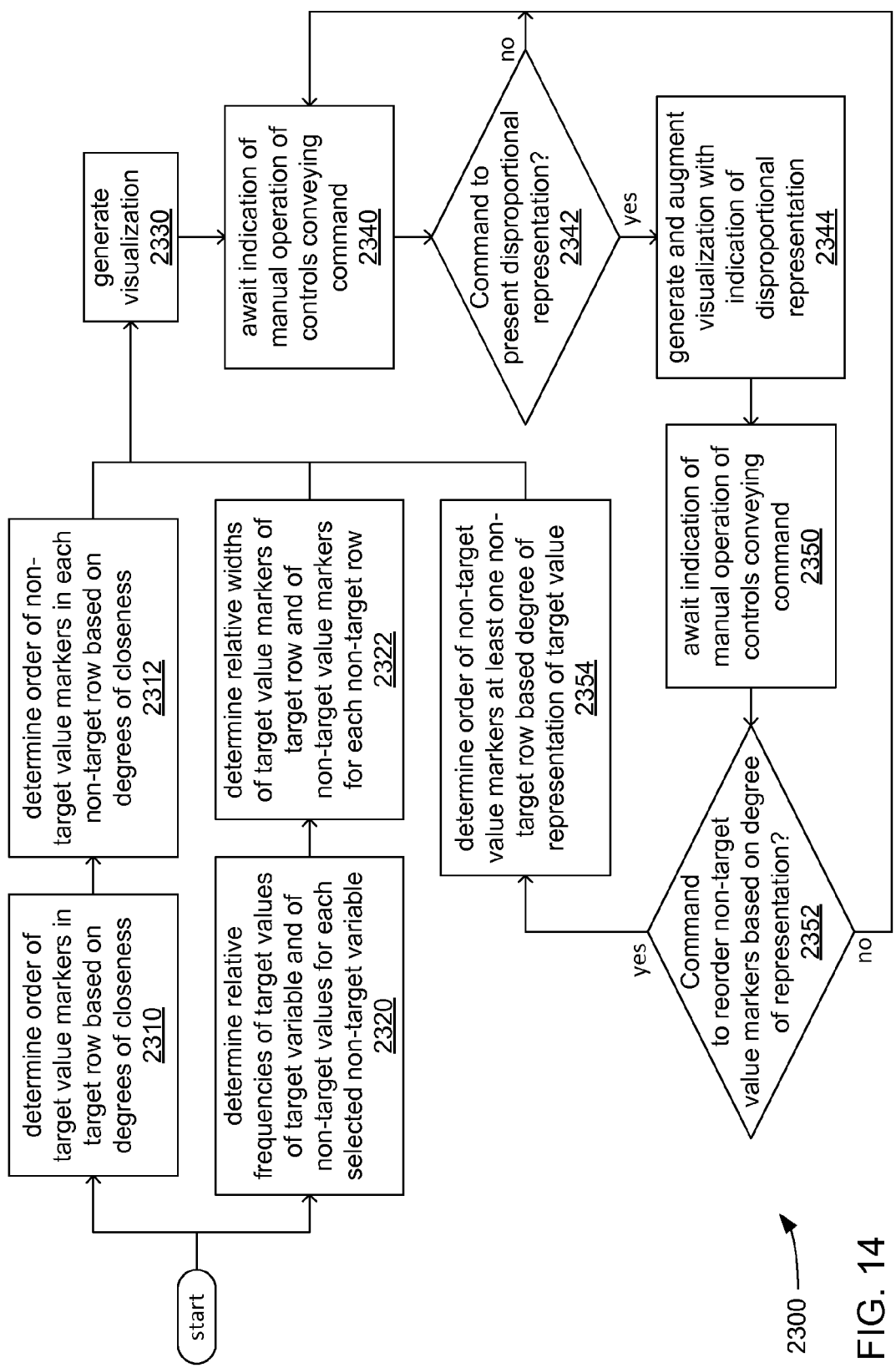
FIG. 14 illustrates an example embodiment of a logic flow of augmenting a visualization with an indication of disproportional representation of a target value within at least one non-target value.

FIG. 14 illustrates an example embodiment of a logic flow 2300. The logic flow 2300 may be representative of some or all of the operations executed by one or more embodiments described herein. More specifically, the logic flow 2300 may illustrate operations performed the by processor components 550, 650 and/or 750 in executing the preprocessing routine 540 and/or the UI routine 740, and/or performed by other component(s) of at least the computing device 500, the controller 600 and/or the viewing device 700 in generating a visualization 830 on the display 780.

At 2310, the order of target value markers within a target row of a visualization (e.g., the visualization 830) is determined based on degrees of closeness of the target values represented by those target markers. Correspondingly, at 2312, the order of non-target value markers within each non-target row of the visualization is determined based on degrees of closeness of the non-target values represented by those non-target value markers to the target values.

At 2320, the relative frequencies of each of the target values of the target variable, and of each of the non-target values of each of the non-target variables selected for inclusion in the visualization are determined. At 2322, the relative widths of the target value markers of the target row are determined based on the relative frequencies of the target values they represent, as are the non-target value markers within each of the non-target rows based on the relative frequencies of the non-target values that they represent.

As depicted, 2310 and/or 2312 may be performed in parallel with 2320 and/or 2322. At 2330, a processor component of a computing device (e.g., the processor component 550 or 650 of the computing device 500, or the processor component 750 of the viewing device) generates the visualization.

At 2340, the processor component awaits an indication of manual operation of controls (e.g., the controls 720) to convey a command. At 2342, a check is made to determine whether such an indication conveys a command to present an indication of disproportional representation of a target value of the target variable within a non-target value of one of the non-target variables selected to be included in the visualization. If the command is not a command to present an indication of disproportional representation, then the processor component again awaits an indication of manual operation to convey a command at 2340.

However, if the command is a command to present an indication of disproportional representation, then such an indication is generated and the visualization is augmented with that indication at 2344. As previously discussed, in some embodiments, such an indication may take the form of a graph of disproportional representation overlain atop the visualization (an example of which is depicted in FIG. 9). In other embodiments, the non-target value markers of one or more of the non-target rows in the visualization may be altered to employ colors associated with and unique to each of the target value markers to indicate which target values are over represented and/or are under represented within each of the non-target values represented by those altered non-target value markers (an example of which is depicted in FIG. 10).

At 2350, the processor component awaits another indication of manual operation of controls (e.g., the controls 720) to convey a command. At 2352, a check is made to determine whether such another indication conveys a command to reorder the non-target value markers within at least one non-target row based on degree of representation of a target value within non-target values represented by those non-target value markers. If the command is not a command to present an indication of disproportional representation, then the processor component again awaits an indication of manual operation to convey a command at 2340. However, if the command is a command to so reorder the non-target value markers within one or more of the non-target rows, then such reordering of non-target value markers is performed at 2354. Following such reordering, the visualization is re-generated with such reordering of non-target value markers at 2330.

Figure 15:
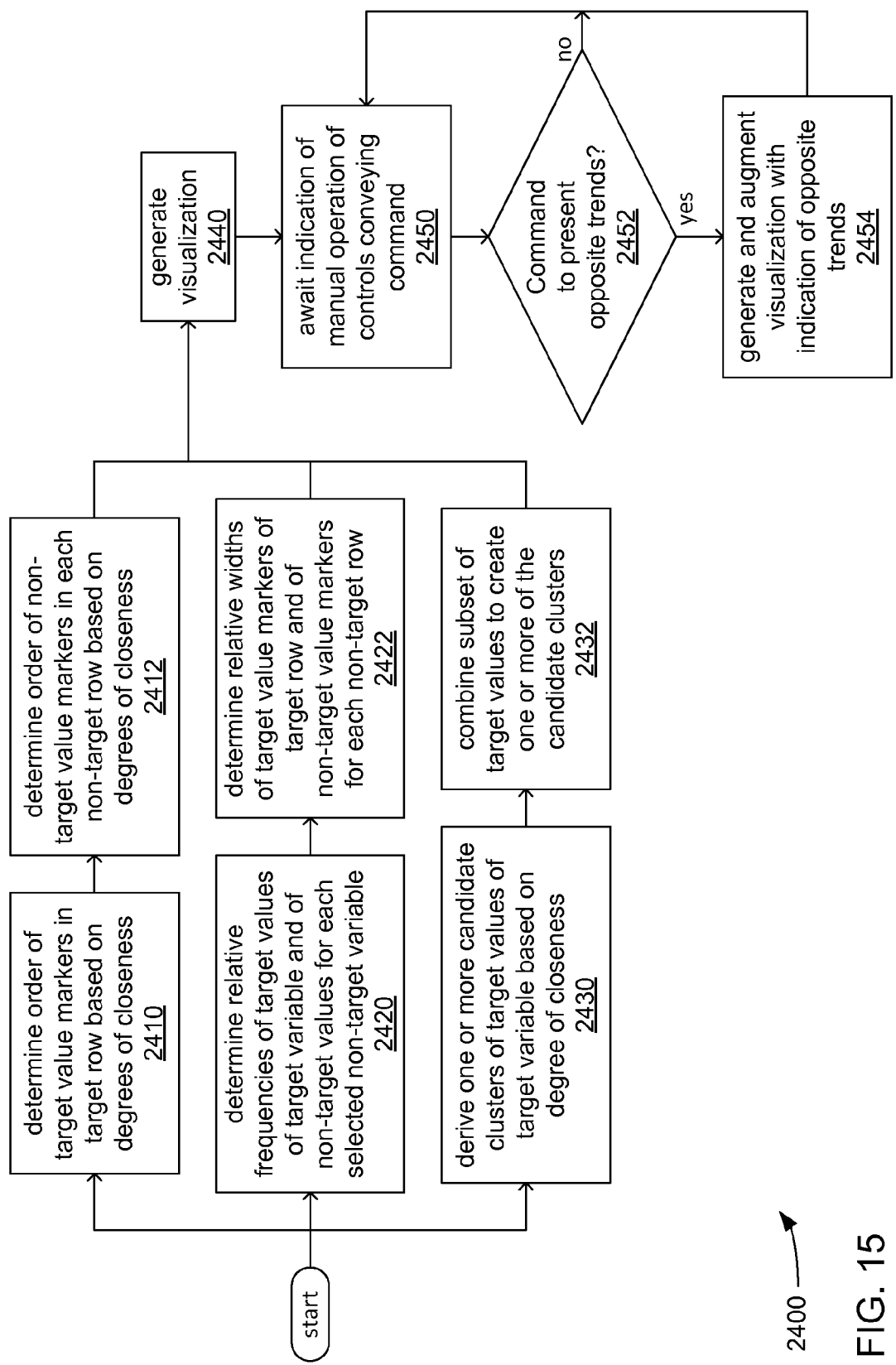
FIG. 15 illustrates an example embodiment of a logic flow of augmenting a visualization with an indication of opposite trends between a target value and a cluster including that target value.

FIG. 15 illustrates an example embodiment of a logic flow 2400. The logic flow 2400 may be representative of some or all of the operations executed by one or more embodiments described herein. More specifically, the logic flow 2400 may illustrate operations performed by the processor components 550, 650 and/or 750 in executing the preprocessing routine 540 and/or the UI routine 740, and/or performed by other component(s) of at least the computing device 500, the controller 600 and/or the viewing device 700 in generating a visualization 830 on the display 780.

2410, 2412, 2420 and 2422 of logic flow 2400 are substantially similar to 2310, 2312, 2320 and 2322, respectively, of logic flow 2300. At 2430, one or more candidate combinations of target values of a target variable to form one or more possible candidate clusters are derived based on degrees of closeness of the target values. More specifically, candidate clusters may be derived by combining target values that have a higher degree of closeness to each other than other target values. At 2432, two or more of the target values are so combined to form one or more of the candidate clusters.

As depicted, 2410 and/or 2412 may be performed in parallel with 2420 and/or 2422, which also may be performed in parallel with 2430 and/or 2432. At 2440, a processor component of a computing device (e.g., the processor component 550 or 650 of the computing device 500, or the processor component 750 of the viewing device) generates the visualization.

At 2450, the processor component awaits an indication of manual operation of controls (e.g., the controls 720) to convey a command. At 2452, a check is made to determine whether such an indication conveys a command to present an indication of opposite trends between a target value and a cluster into which that target value has been combined. If the command is not a command to present an indication of opposite trends, then the processor component again awaits an indication of manual operation to convey a command at 2450.

However, if the command is a command to present an indication of opposite trends, then such an indication is generated and the visualization is augmented with that indication at 2454. As previously discussed, in some embodiments, such an indication may take the form of a graph of opposite trends overlain atop the visualization (an example of which is depicted in FIG. 11).

Figure 16:
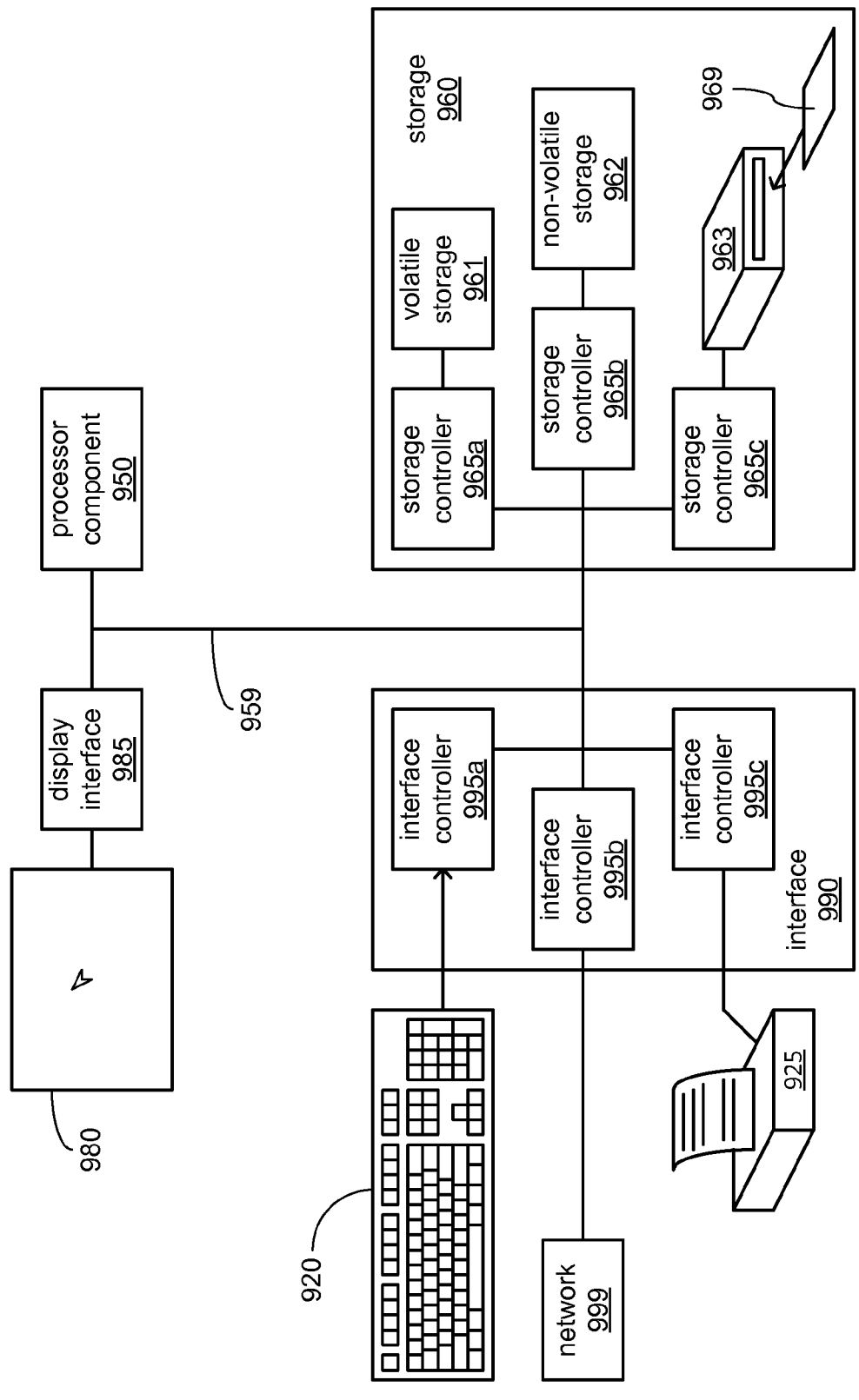
FIG. 16 illustrates an example embodiment of a processing architecture.

FIG. 16 illustrates an example embodiment of a processing architecture 3000 suitable for implementing various embodiments as previously described. More specifically, the processing architecture 3000 (or variants thereof) may be implemented as part of one or more of the computing devices 300, 500 or 700, or the controller 600. It should be noted that components of the processing architecture 3000 are given reference numbers in which the last two digits correspond to the last two digits of reference numbers of at least some of the components earlier depicted and described as part of the computing devices 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information over the communications media. The information can be implemented as transmissions allocated to one or more electrical and/or optical conductors. A message (including a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a touch screen 980 incorporating a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands and/or data are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350 and 550) may include any of a wide variety of commercially available processors, employing any of a wide variety of technologies and implemented with one or more cores physically combined in any of a number of ways.

As previously discussed, the storage 960 (corresponding to the storages 360 and 560) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969. The machine-readable storage medium 969, with executable instructions stored thereon, may be an example embodiment of a computer-program product that may or may not be fabricated in large quantities to enable distribution of those executable instructions.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interfaces 590 or 790) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 780), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the touch screen 980 may make use of timings and/or protocols that conform to any of a variety of industry standards, including without limitation, any of a variety of analog video interfaces, Digital Video Interface (DVI), DisplayPort, etc.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server, which can deliver statistical modeling and machine learning capabilities in a highly interactive programming environment that enables multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-program product tangibly embodied in a non-transitory machine-readable storage medium, the computer-program product including instructions operable to cause a computing device to perform operations including:

receive, via an interface, a data set for generating a visualization for presentation on a display;

receive a selection of a variable of the data set to become a target variable for generating the visualization;

perform an association measurement between the target variable and each non-target variable of a data set to determine a degree of association between the target variable and each non-target variable;

select non-target variables for inclusion in the visualization of the data set up to a maximum quantity of non-target variables for inclusion in the visualization based on the degree of association between each non-target variable and the target variable;

perform correspondence analysis between target values of the target variable and non-target values of each selected non-target variable to determine degrees of closeness among the target variables and to determine degrees of closeness between the target values of the target variable and the non-target values of each of the selected non-target variables;

order target value markers within a target row of the visualization based on the degrees of closeness among the target values of the target variable, wherein the target row corresponds to the target variable and each target value marker represents at least one of the target values;

order non-target value markers within each non-target row of multiple non-target rows of the visualization based on the degrees of closeness between the non-target values of each of the selected non-target variables and the target values of the target variable, wherein each non-target row corresponds to one of the selected non-target variables and each non-target value marker represents a non-target value of the corresponding selected non-target variable;

determine a width of each target value marker based on a frequency of occurrence of the target value represented by the target value marker in the data set;

determine a width of each non-target value marker based on a frequency of occurrence of the non-target value represented by the non-target value marker in the data set;

cause generation, by circuitry, of the visualization, wherein the visualization comprises the target row and the multiple non-target rows presented as parallel rows with connection markers emanating from the target value markers and extending among the non-target value markers; and present, by circuitry, the visualization on a display.

2. The computer-program product of claim 1, the computing device caused to perform operations including order the non-target rows relative to the target row based on the degree of association of the non-target values of each of the non-target variables to the target values of the target variable.

3. The computer-program product of claim 1, the computing device caused to perform operations including determine a distance between each adjacent pair of the target value markers in the target row based on degree of closeness between the target values represented by the target value markers in each adjacent pair.

4. The computer-program product of claim 1, the computing device caused to perform operations including monitor controls of the computing device for an indication of manual operation to select at least one of a variable of the data set to become the maximum quantity of non-target variables for inclusion in the visualization.

5. The computer-program product of claim 1, the computing device caused to perform operations including receive an indication via a network from a viewing device of a selection of at least one of a variable of the data set to become the maximum quantity of non-target variables for inclusion in the visualization.

6. The computer-program product of claim 1, the computing device caused to perform operations including generate the visualization as a parallel sets visualization wherein:

the target row and the multiple non-target rows are arranged as parallel horizontal rows;

at least one connection marker extends between a target value marker of the target row and a non-target value marker of a non-target row that is adjacent to the target row; and at least one other connection marker extends between a non-target value marker of one non-target row and another non-target value marker of another non-target row that is adjacent to the one non-target row.

7. The computer-program product of claim 6, the computing device caused to perform operations including:

present, by circuitry, a menu on the display, wherein the menu comprises at least one graphical control operable to alter at least one of a selection of the target variable, the maximum quantity of non-target variables, a selection of ordering of the non-target value markers within each non-target row, widths of the target value markers or the widths of the non-target value markers.

8. The computer-program product of claim 1, the computing device caused to perform operations including enable a viewing device to present the visualization on the display by transmitting preprocessed data comprising mapping data indicating ordering of the target value markers within the target row and ordering of the non-target value markers within each non-target row, and frequency data indicating frequencies of occurrence in the data set of each target value represented by each target value marker and frequencies of occurrence in the data set of each non-target value represented by each non-target value marker.

9. The computer-program product of claim 1, the computing device caused to perform operations including combine more than one of the target values into a cluster represented by a single target value marker of the target row in response to a quantity of target values of the target variable exceeding a maximum quantity of target value markers to be presented in the target row.

10. The computer-program product of claim 9, the computing device caused to perform operations including:

monitor controls of the computing device for an indication of manual operation to select a specific target value combined into the cluster for separation from the cluster; and augment the target row with another target value marker representing the specific target value separately from the cluster.

11. The computer-program product of claim 9, the computing device caused to perform operations including augment the visualization with an indication of an opposite trend between a degree of representation of a specific target value and a degree of representation of the cluster in at least one non-target value, wherein the cluster comprises the specific target value.

12. The computer-program product of claim 1, the computing device caused to perform operations including augment the visualization with an indication of at least one of which target value is most overrepresented or which target value is most underrepresented in a non-target value represented by a non-target value marker of one of the non-target rows.

13. The computer-program product of claim 12, the computing device caused to perform operations including generate by circuitry, the non-target value marker to provide the indication of which target value is most overrepresented or which target value is most underrepresented in the non-target value represented by the non-target value marker.

14. The computer-program product of claim 12, the computing device caused to perform operations including reorder the non-target value markers within at least one non-target row based on degree of representation of a selected target value in each non-target value represented by the non-target value markers within the at least one non-target row.

15. A computer-implemented method comprising:

receiving, via an interface, a data set for generating a visualization for presentation on a display;

receiving a selection of a variable of the data set to become the target variable for generating the visualization;

performing an association measurement between the target variable and each non-target variable of the data set to determine a degree of association between the target variable and each non-target variable;

selecting non-target variables for inclusion in the visualization of the data set up to a maximum quantity of non-target variables for inclusion in the visualization based on the degree of association between each non-target variable and the target variable;

performing correspondence analysis between target values of the target variable and non-target values of each selected non-target variable to determine degrees of closeness among the target variables and to determine degrees of closeness between the target values of the target variable and the non-target values of each of the selected non-target variables;

ordering target value markers within a target row of the visualization based on the degrees of closeness among the target values of the target variable, wherein the target row corresponds to the target variable and each target value marker represents at least one of the target values;

ordering non-target value markers within each non-target row of multiple non-target rows of the visualization based on the degrees of closeness between the non-target values of each of the selected non-target variables and the target values of the target variable, wherein each non-target row corresponds to one of the selected non-target variables and each non-target value marker represents a non-target value of the corresponding selected non-target variable;

determining a width of each target value marker based on frequency of occurrence of the target value represented by the target value marker in the data set;

determining a width of each non-target value marker based on frequency of occurrence of the non-target value represented by the non-target value marker in the data set;

causing generation, by circuitry, of the visualization, wherein the visualization comprises the target row and the multiple non-target rows arranged as parallel rows with connection markers emanating from the target value markers and extending among the non-target value markers; and presenting, by circuitry, the visualization on a display.

16. The computer-implemented method of claim 15, comprising ordering the non-target rows relative to the target row based on the degree of association of the non-target values of each of the non-target variables to the target values of the target variable.

17. The computer-implemented method of claim 15, comprising determining a distance between each adjacent pair of the target value markers in the target row based on degree of closeness between the target values represented by the target value markers in each adjacent pair.

18. The computer-implemented method of claim 15, comprising monitoring controls for an indication of manual operation to select at least one of a variable of the data set to become the maximum quantity of non-target variables for inclusion in the visualization.

19. The computer-implemented method of claim 15, comprising receiving an indication via a network from a viewing device of a selection of at least one of a variable of the data set to become the maximum quantity of non-target variables for inclusion in the visualization.

20. The computer-implemented method of claim 15, comprising generating the visualization as a parallel sets visualization wherein:

the target row and the multiple non-target rows are arranged as parallel horizontal rows;

at least one connection marker extends between a target value marker of the target row and a non-target value marker of a non-target row that is adjacent to the target row; and at least one other connection marker extends between a non-target value marker of one non-target row and another non-target value marker of another non-target row that is adjacent to the one non-target row.

21. The computer-implemented method of claim 20, comprising:

presenting, by circuitry, a menu on the display, wherein the menu comprises at least one graphical control operable to alter at least one of a selection of the target variable, the maximum quantity of non-target variables, a selection of ordering of the non-target value markers within each non-target row, widths of the target value markers or the widths of the non-target value markers.

22. The computer-implemented method of claim 15, comprising enabling a viewing device to present the visualization on the display by transmitting preprocessed data comprising mapping data indicating ordering of the target value markers within the target row and ordering of the non-target value markers within each non-target row, and frequency data indicating frequencies of occurrence in the data set of each target value represented by each target value marker and frequencies of occurrence in the data set of each non-target value represented by each non-target value marker.

23. The computer-implemented method of claim 15, comprising combining more than one of the target values into a cluster represented by a single target value marker of the target row in response to a quantity of target values of the target variable exceeding a maximum quantity of target value markers to be presented in the target row.

24. The computer-implemented method of claim 23, comprising:

monitoring controls of the computing device for an indication of manual operation to select a specific target value combined into the cluster for separation from the cluster; and augmenting the target row with an another target value marker representing the specific target value separately from the cluster.

25. The computer-implemented method of claim 23, comprising augmenting the visualization with an indication of an opposite trend between a degree of representation of a specific target value and a degree of representation of the cluster in at least one non-target value, wherein the cluster comprises the specific target value.

26. The computer-implemented method of claim 15, comprising augmenting the visualization with an indication of at least one of which target value is most overrepresented or which target value is most underrepresented in a non-target value represented by a non-target value marker of one of the non-target rows.

27. The computer-implemented method of claim 26, comprising generating by circuitry, the non-value target marker to provide the indication of which target value is most overrepresented or which target value is most underrepresented in the non-target value represented by the non-target value marker.

28. The computer-implemented method of claim 26, comprising reordering the non-target value markers within at least one non-target row based on degree of representation of a selected target value in each non-target value represented by the non-target value markers within the at least one non-target row.

29. An apparatus comprising:
a processor;

logic, at least partially implemented by the processor, the logic to:
  receive, via an interface, a data set for generating a visualization for presentation on a display;
  receive a selection of a target variable in the data set for generating the visualization;
  perform an association measurement between the target variable and each non-target variable of the data set to determine a degree of association between the target variable and each non-target variable; and
  select non-target variables for inclusion in the visualization of the data set up to a maximum quantity of non-target variables for inclusion in the visualization based on the degree of association between each non-target variable and the target variable;
a correspondence analysis component for execution by the processor component to:
  perform correspondence analysis between target values of the target variable and non-target values of each selected non-target variable to determine degrees of closeness among the target variables and to determine degrees of closeness between the target values of the target variable and the non-target values of each of the selected non-target variables;
  order target value markers within a target row of the visualization based on the degrees of closeness among the target values of the target variable, wherein the target row corresponds to the target variable and each target value marker represents at least one of the target values;
  order non-target value markers within each non-target row of multiple non-target rows of the visualization based on the degrees of closeness between the non-target values of each of the selected non-target variables and the target values of the target variable, wherein each non-target row corresponds to one of the selected non-target variables and each non-target value marker represents a non-target value of the corresponding selected non-target variable;
  determine a width of each target value marker based on frequency of occurrence of the target value represented by the target value marker in the data set; and
  determine a width of each non-target value marker based on frequency of occurrence of the non-target value represented by the non-target value marker in the data set;
  cause generation, by circuitry, of the visualization, wherein the visualization comprises the target row and the multiple non-target rows presented as parallel rows with connection markers emanating from the target value markers and extending among the non-target value markers; and
  present, by circuitry, the visualization on a display.

30. The apparatus of claim 29, the logic to order the non-target rows relative to the target row based on the degree of association of the non-target values of each of the non-target variables to the target values of the target variable.

31. The apparatus of claim 29, the logic to determine a distance between each adjacent pair of the target value markers in the target row based on degree of closeness between the target values represented by the target value markers in each adjacent pair.

32. The apparatus of claim 29, the logic to monitor controls for an indication of manual operation to select at least one of a variable of the data set to become the maximum quantity of non-target variables for inclusion in the visualization.

33. The apparatus of claim 29, the logic to receive an indication via a network from a viewing device of a selection of at least one of a variable of the data set to become the maximum quantity of non-target variables for inclusion in the visualization.

34. The apparatus of claim 29, comprising the display.

35. The apparatus of claim 29, the logic to transmit to a view device preprocessed data to enable the viewing device to present the visualization on a display, wherein the preprocessed data comprises mapping data indicating ordering of the target value markers within the target row and ordering of the non-target value markers within each non-target row, and frequency data indicating frequencies of occurrence in the data set of each target value represented by each target value marker and frequencies of occurrence in the data set of each non-target value represented by each non-target value marker.

36. The apparatus of claim 29, the logic to combine more than one of the target values into a cluster represented by a single target value marker of the target row in response to a quantity of target values of the target variable exceeding a maximum quantity of target value markers to be presented in the target row.

37. The apparatus of claim 36, the logic to:
  monitor controls for an indication of manual operation to select a specific target value combined into the cluster for separation from the cluster; and
  augment the target row with another target value marker representing the specific target value separately from the cluster.

38. The apparatus of claim 36, the logic to augment the visualization with an indication of an opposite trend between a degree of representation of a specific target value and a degree of representation of the cluster in at least one non-target value, wherein the cluster comprises the specific target value.

39. The apparatus of claim 29, the logic to augment the visualization with an indication of at least one of which target value is most overrepresented or which target value is most underrepresented in a non-target value represented by a non-target value marker of one of the non-target rows.

40. The apparatus of claim 39, the logic to generate the non-value target marker to provide the indication of which target value is most overrepresented or which target value is most underrepresented in the non-target value represented by the non-target value marker.

41. The apparatus of claim 39, the logic to reorder the non-target value markers within at least one non-target row based on degree of representation of a selected target value in each non-target value represented by the non-target value markers within the at least one non-target row.

* * * * *